United States Patent
Araki et al.

(10) Patent No.: US 11,887,759 B2
(45) Date of Patent: *Jan. 30, 2024

(54) INSULATED ELECTRIC WIRE WITH WATER-STOPPING AGENT, WIRE HARNESS, AND INSULATED ELECTRIC WIRE PRODUCTION METHOD

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichiro Araki, Yokkaichi (JP); Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 265 days.

This patent is subject to a terminal disclaimer.

(21) Appl. No.: 17/427,375

(22) PCT Filed: Jan. 30, 2019

(86) PCT No.: PCT/JP2019/003196
§ 371 (c)(1),
(2) Date: Jul. 30, 2021

(87) PCT Pub. No.: WO2020/157868
PCT Pub. Date: Aug. 6, 2020

(65) Prior Publication Data
US 2022/0028581 A1    Jan. 27, 2022

(51) Int. Cl.
 *H01B 7/285* (2006.01)
 *H01B 7/282* (2006.01)
 (Continued)

(52) U.S. Cl.
 CPC .......... *H01B 7/285* (2013.01); *H01B 7/2825* (2013.01); *H01B 13/012* (2013.01); *H01B 13/06* (2013.01); *H01B 13/32* (2013.01)

(58) Field of Classification Search
 None
 See application file for complete search history.

(56) References Cited

U.S. PATENT DOCUMENTS 2,396,702 A * 3/1946 Johnson ................. H02G 15/14
                                                    174/23 R
3,639,567 A * 2/1972 Hervig ................. H01B 13/221
                                                    264/331.19
(Continued)

FOREIGN PATENT DOCUMENTS

CA    2202191 A1    10/1997
CA    2202191 A1 *  10/1997
(Continued)

OTHER PUBLICATIONS

Sep. 20, 2022 Office Action issued in Japanese Patent Application No. 2020-569238.
(Continued)

*Primary Examiner* — Timothy J. Dole
*Assistant Examiner* — Muhammed Azam
(74) *Attorney, Agent, or Firm* — Oliff PLC

(57) ABSTRACT

An insulated electric wire includes a conductor in which elemental wires made of a metal material are twisted together; and an insulation covering that covers an outer circumference of the conductor. The insulated electric wire includes: an exposed portion in which the insulation cover-
(Continued)

ing is removed from the outer circumference of the conductor; a covered portion in which the insulation covering covers the outer circumference of the conductor, the exposed portion and the covered portion being provided adjacent to each other in a longitudinal axis direction; and a water-stopping portion in which gaps between the elemental wires in the exposed portion are filled with a water-stopping agent. In an area enclosed by the surface of the water-stopping agent, the surface of the elemental wires is in contact with only the water-stopping agent or another elemental wire.

16 Claims, 10 Drawing Sheets

(51) Int. Cl.
*H01B 13/012* (2006.01)
*H01B 13/06* (2006.01)
*H01B 13/32* (2006.01)

(56) References Cited

U.S. PATENT DOCUMENTS

| | | | | | |
|---|---|---|---|---|---|
| 3,737,557 | A | * | 6/1973 | Verne | H01B 9/00 174/23 R |
| 4,361,507 | A | * | 11/1982 | Bourland | C08L 53/025 524/505 |
| 4,978,694 | A | * | 12/1990 | Vincent | H01B 13/322 524/506 |
| 5,281,757 | A | * | 1/1994 | Marin | H01B 9/022 174/106 SC |
| 5,902,849 | A | * | 5/1999 | Heucher | G02B 6/4401 585/12 |
| 7,952,020 | B2 | * | 5/2011 | Yamamoto | H01R 13/5208 174/23 R |
| 9,853,342 | B2 | * | 12/2017 | Henry | H01P 3/16 |
| 9,949,392 | B1 | * | 4/2018 | Ushiro | H01B 7/2825 |
| 2006/0063418 | A1 | * | 3/2006 | Motzigkeit | H02G 15/013 439/425 |
| 2007/0007038 | A1 | * | 1/2007 | Cox | H02G 15/013 174/650 |
| 2008/0283268 | A1 | | 11/2008 | Iwasaki et al. | |
| 2010/0212936 | A1 | * | 8/2010 | Arai | H01B 7/285 29/857 |
| 2011/0048762 | A1 | * | 3/2011 | Sawamura | H01B 3/441 228/110.1 |
| 2012/0097414 | A1 | * | 4/2012 | O'Sullivan | H02G 3/088 174/50 |
| 2012/0217036 | A1 | | 8/2012 | Kuriyagawa | |
| 2014/0299353 | A1 | * | 10/2014 | Saito | H01B 7/282 29/868 |
| 2015/0349473 | A1 | * | 12/2015 | Montena | H02G 15/18 174/88 C |
| 2016/0027552 | A1 | | 1/2016 | Kuriyagawa et al. | |
| 2016/0260523 | A1 | * | 9/2016 | Aragiri | H01B 7/282 |
| 2017/0243571 | A1 | * | 8/2017 | Nakashima | C09J 133/14 |
| 2019/0096543 | A1 | * | 3/2019 | Itou | H02G 15/003 |
| 2020/0286648 | A1 | * | 9/2020 | Furukawa | H01B 7/0009 |

FOREIGN PATENT DOCUMENTS

| | | | | |
|---|---|---|---|---|
| CN | 87102361 | A | * 10/1987 | C09D 5/44 |
| CN | 87102361 | A | 10/1987 | |
| CN | 1365123 | A | 8/2002 | |
| CN | 1365123 | A | * 8/2002 | |
| CN | 1465617 | A | * 1/2004 | |
| CN | 1465617 | A | 1/2004 | |
| CN | 101248558 | A | 8/2008 | |
| CN | 102598161 | A | 7/2012 | |
| CN | 103119662 | A | * 5/2013 | H01B 7/282 |
| CN | 103119662 | A | 5/2013 | |
| CN | 103907161 | A | 7/2014 | |
| CN | 105122382 | A | 12/2015 | |
| CN | 106898419 | A | * 6/2017 | G02B 6/443 |
| CN | 106898419 | A | 6/2017 | |
| CN | 206370303 | U | * 8/2017 | |
| CN | 206370303 | U | 8/2017 | |
| CN | 107851491 | A | 3/2018 | |
| CN | 109065232 | A | 12/2018 | |
| CN | 109065232 | A | * 12/2018 | |
| CN | 109074914 | A | 12/2018 | |
| DE | 3708216 | A1 | 9/1988 | |
| DE | 3708216 | A1 | * 9/1988 | |
| DE | 202012010582 | U1 | 12/2012 | |
| DE | 202012010582 | U1 | * 2/2013 | |
| DE | 10 2011 083 952 | A1 | 4/2013 | |
| DE | 112019006772 | T5 | * 10/2021 | |
| DE | 112019006772 | T5 | 10/2021 | |
| EP | 0332821 | A2 | * 1/1989 | |
| EP | 0332821 | A2 | 9/1989 | |
| EP | 0720179 | A2 | * 9/1995 | |
| EP | 0720179 | A2 | 7/1996 | |
| FR | 2472820 | A1 | 7/1981 | |
| FR | 2472820 | A1 | * 7/1981 | |
| FR | 2500202 | A1 | * 8/1982 | |
| FR | 2500202 | A1 | 8/1982 | |
| JP | S53-014169 | U | 2/1978 | |
| JP | 62040406 | A | * 2/1987 | G02B 6/4401 |
| JP | S62-40406 | A | 2/1987 | |
| JP | H07-105746 | A | 4/1995 | |
| JP | H07105746 | A | * 4/1995 | |
| JP | H08-335411 | A | 12/1996 | |
| JP | H08335411 | A | * 12/1996 | |
| JP | H09-102222 | A | 4/1997 | |
| JP | H09102222 | A | * 4/1997 | |
| JP | H09-204822 | A | 8/1997 | |
| JP | H09204822 | A | * 8/1997 | |
| JP | H10-51935 | A | 2/1998 | |
| JP | H1051935 | A | * 2/1998 | |
| JP | H10-204227 | A | 8/1998 | |
| JP | H10204227 | A | * 8/1998 | |
| JP | H11224541 | A | * 8/1998 | |
| JP | H11-224541 | A | 8/1999 | |
| JP | 2000-011771 | A | 1/2000 | |
| JP | 2000011771 | A | * 1/2000 | |
| JP | 2000-082834 | A | 3/2000 | |
| JP | 2003-051217 | A | 2/2003 | |
| JP | 2003051217 | A | * 2/2003 | |
| JP | 2004221047 | A | * 8/2004 | |
| JP | 2004221047 | A | 8/2004 | |
| JP | 2004355897 | A | 12/2004 | |
| JP | 2004355897 | A | * 12/2004 | |
| JP | 2005-019392 | A | 1/2005 | |
| JP | 2005019392 | A | * 1/2005 | H01B 7/2806 |
| JP | 2005-032621 | A | 2/2005 | |
| JP | 2005048080 | A | 2/2005 | |
| JP | 2005048080 | A | * 2/2005 | |
| JP | 2006032127 | A | 2/2006 | |
| JP | 2006032127 | A | * 2/2006 | |
| JP | 2006074068 | A | * 3/2006 | |
| JP | 2006074068 | A | 3/2006 | |
| JP | 2007-134137 | A | 5/2007 | |
| JP | 2007-141569 | A | 6/2007 | |
| JP | 2007-226999 | A | 9/2007 | |
| JP | 2007-287647 | A | 11/2007 | |
| JP | 2007-317480 | A | 12/2007 | |
| JP | 2008-117616 | A | 5/2008 | |
| JP | 2008123712 | A | * 5/2008 | |
| JP | 2008123712 | A | 5/2008 | |
| JP | 2008226487 | A | * 9/2008 | |
| JP | 2008226487 | A | 9/2008 | |
| JP | 2009-135073 | A | 6/2009 | |
| JP | 2009231099 | A | 10/2009 | |
| JP | 2009231099 | A | * 10/2009 | |
| JP | 2010-113953 | A | 5/2010 | |
| JP | 2010114027 | A | 5/2010 | |
| JP | 2010114027 | A | * 5/2010 | |
| JP | 2010136485 | A | * 6/2010 | |
| JP | 2010136485 | A | 6/2010 | |
| JP | 2010154733 | A | * 7/2010 | G06F 283/008 |
| JP | 2010154733 | A | 7/2010 | |

(56) References Cited

FOREIGN PATENT DOCUMENTS

| | | | | |
|---|---|---|---|---|
| JP | 2010-231978 | A | 10/2010 | |
| JP | 2010231978 | A * | 10/2010 | |
| JP | 2011-096567 | A | 5/2011 | |
| JP | 2012-248527 | A | 12/2012 | |
| JP | 2013-097922 | A | 5/2013 | |
| JP | 5475158 | B1 | 4/2014 | |
| JP | 5475158 | B1 * | 4/2014 | |
| JP | 2014100010 | A * | 5/2014 | |
| JP | 2014100010 | A | 5/2014 | |
| JP | 2014-107976 | A | 6/2014 | |
| JP | 2014107976 | A * | 6/2014 | |
| JP | 2014-519137 | A | 8/2014 | |
| JP | 2016-119168 | A | 6/2016 | |
| JP | 2016-225112 | A | 12/2016 | |
| WO | 9207366 | A1 | 4/1992 | |
| WO | WO-9207366 | A1 * | 4/1992 | ........... H01B 7/0208 |
| WO | 03085793 | A1 | 10/2003 | |
| WO | WO-03085793 | A1 * | 10/2003 | ......... H01R 13/5216 |
| WO | 2007/013589 | A1 | 2/2007 | |
| WO | WO-2007013589 | A1 * | 2/2007 | |
| WO | 2007052693 | A1 | 5/2007 | |
| WO | WO-2007052693 | A1 * | 5/2007 | ............ H01B 7/285 |
| WO | 2007/088798 | A1 | 8/2007 | |
| WO | WO-2007088798 | A1 * | 8/2007 | ............... H01B 3/28 |
| WO | 2008040626 | A1 | 4/2008 | |
| WO | WO-2008040626 | A1 * | 4/2008 | ......... B60R 16/0207 |
| WO | 2009/060639 | A1 | 5/2009 | |
| WO | 2009/136460 | A1 | 11/2009 | |
| WO | 2009139220 | A1 | 11/2009 | |
| WO | WO-2009136460 | A1 * | 11/2009 | ......... B60R 16/0207 |
| WO | WO-2009139220 | A1 * | 11/2009 | ............ H01B 7/285 |
| WO | 2012042979 | A1 | 4/2012 | |
| WO | WO-2012042979 | A1 * | 4/2012 | ........... H01B 7/2825 |
| WO | 2014/125666 | A1 | 8/2014 | |
| WO | WO-2014125666 | A1 * | 8/2014 | ......... B60R 16/0215 |
| WO | 2014/135615 | A1 | 9/2014 | |
| WO | WO-2014135615 | A1 * | 9/2014 | ............. H01B 1/023 |
| WO | 2014168200 | A1 | 10/2014 | |
| WO | WO-2014168200 | A1 * | 10/2014 | ......... H01B 13/0013 |
| WO | 2019021850 | A1 | 1/2019 | |
| WO | WO-2019021850 | A1 * | 1/2019 | |
| WO | 2019/177016 | A1 | 9/2019 | |
| WO | WO-2019177016 | A1 * | 9/2019 | ......... H01B 13/0006 |
| WO | 2019/188062 | A1 | 10/2019 | |
| WO | WO-2019188062 | A1 * | 10/2019 | ................ C08F 2/14 |
| WO | 2020/157867 | A1 | 8/2020 | |
| WO | 2020/157868 | A1 | 8/2020 | |
| WO | 2020/158445 | A1 | 8/2020 | |
| WO | 2020/158862 | A1 | 8/2020 | |
| WO | WO-2020157867 | A1 * | 8/2020 | ............. H01B 7/285 |
| WO | WO-2020157868 | A1 * | 8/2020 | ......... B60R 16/0207 |
| WO | WO-2020158445 | A1 * | 8/2020 | ........... H01B 7/0045 |
| WO | WO-2020158862 | A1 * | 8/2020 | ......... B60R 16/0207 |

OTHER PUBLICATIONS

Aug. 10, 2022 Office Action issued in Chinese Patent Application No. 202080011525.9.
Sep. 20, 2022 Office Action issued in Japanese Patent Application No. 2020-569239.
1 Jun. 2, 2022 Office Action issued in Chinese Patent Application No. 202080011663.7.
Mar. 28, 2023 Office Action issued in Chinese Patent Application No. 201980089342.6.
Apr. 4, 2023 Office Action issued in Japanese Patent Application No. 2019-219009.
Jul. 20, 2022 Office Action issued in Chinese Patent Application No. 201980089342.6.
Feb. 26, 2019 Search Report issued in International Patent Application No. PCT/JP2019/003195.
Mar. 31, 2020 Search Report issued in International Patent Application No. PCT/JP2020/003430.
Feb. 25, 2020 International Search Report issued in International Patent Application No. PCT/JP2020/001453.
U.S. Appl. No. 17/426,577, filed Jul. 28, 2021 in the name of Araki et al.
U.S. Appl. No. 17/426,581, filed Jul. 28, 2021 in the name of Araki et al.
U.S. Appl. No. 17/426,530, filed Jul. 28, 2021 in the name of Araki et al.
Apr. 23, 2019 International Search Report issued in International Patent Application No. PCT/JP2019/003196.
Mar. 10, 2022 Office Action issued in Indian Patent Application No. 202117036240.
Mar. 10, 2022 Office Action issued in Indian Patent Application No. 202117036742.
Mar. 17, 2022 Office Action issued in Indian Patent Application No. 202117036460.
Feb. 24, 2022 Office Action issued in Indian Patent Application No. 202117036512.
Apr. 1, 27, 2023 Office Action issued in U.S. Appl. No. 17/426,530.
Jun. 16, 2023 Office Action issued in U.S. Appl. No. 17/426,581.
Efunda_reference; Silicone/polyester; https://www.efunda.com/materials/polymers/properties/polymer_datasheet.cfmMajorID=TPE&MinorID=9 (Year: 2023).
Jun. 16, 2023 Office Action issued in U.S. Appl. No. 17/426,577.

* cited by examiner (a)

(b)

(a)

(b)

INSULATED ELECTRIC WIRE WITH WATER-STOPPING AGENT, WIRE HARNESS, AND INSULATED ELECTRIC WIRE PRODUCTION METHOD

TECHNICAL FIELD

The present invention relates to an insulated electric wire, a wire harness, and an insulated electric wire production method, and more specifically to an insulated electric wire and a wire harness that include a water-stopping portion in which an insulation covering is removed and water-stopping treatment is applied using a water-stopping agent, and a method for producing such an insulated electric wire.

BACKGROUND ART

In some cases, water-stopping treatment is applied to a portion of an insulated electric wire in the longitudinal axis direction of the wire. At that time, conventionally and typically, an insulation covering is removed and a conductor is exposed at a position of the insulated electric wire at which a water-stopping portion is to be formed, and a water-stopping agent is placed at this position so as to permeate the gaps between elemental wires that constitute the conductor. A method for placing a water-stopping agent so that it permeates gaps between elemental wires is disclosed in Patent Document 1, for example. In Patent Document 1, a part of a covered electric wire is housed in a compression chamber, and a water-stopping material made of a hot-melt material is forced to permeate the gaps between core wires while feeding air into the compression chamber and discharging the fed air to the outside of the compression chamber via a space inside an insulation covering of the covered electric wire, aiming at the water-stopping material reliably permeating even a small gap between the core wires.

CITATION LIST

Patent Document

Patent Document 1: JP 2007-141569 A

SUMMARY OF INVENTION

Technical Problem

In insulated electric wires, when gaps between elemental wires of an exposed conductor are filled with a water-stopping agent, and water-stopping treatment is applied, the water-stopping performance is affected by not only the property and the amount of use of the water-stopping agent but also the spatial distribution of the water-stopping agent. Even if the same water-stopping agent is used, it may be impossible to realize a sufficient water-stopping performance depending on the distribution of the water-stopping agent in a predetermined area. For example, as disclosed in Patent Document 1, when the water-stopping agent is placed while feeding air into the compression chamber in which a covered electric wire is housed, the fed air may be entrained in the layer of the water-stopping agent, and may affect the spatial distribution of the water-stopping agent.

An object of the present invention is to provide an insulated electric wire that realizes a superior water-stopping performance using a spatial distribution of a water-stopping agent in a water-stopping portion, a wire harness that includes such an insulated electric wire, and a method for producing such an insulated electric wire.

Solution to Problem

In order to solve the above-described problems, an insulated electric wire according to the present invention includes: a conductor in which a plurality of elemental wires made of a metal material are twisted together; and an insulation covering that covers an outer circumference of the conductor; wherein the insulated electric wire includes: an exposed portion in which the insulation covering is removed from the outer circumference of the conductor; a covered portion in which the insulation covering covers the outer circumference of the conductor, the exposed portion and the covered portion being provided adjacent to each other in a longitudinal axis direction of the insulated electric wire; and a water-stopping portion in which gaps between the elemental wires in the exposed portion are filled with a water-stopping agent, and in an area enclosed by a surface of the water-stopping agent, the surfaces of the elemental wires are in contact with only the water-stopping agent or another elemental wire.

Here, preferably, the area enclosed by the surface of the water-stopping agent does not include any bubble, or includes only bubbles whose entire circumference is surrounded by the water-stopping agent, and that are located on the outer side of the conductor.

Also, preferably, in a cross section of the water-stopping portion that is taken perpendicular to the longitudinal axis direction of the insulated electric wire, the elemental wires located in an outer circumferential portion of the conductor has a more flattened shape than the elemental wires located inward of that elemental wire. Furthermore, preferably, ellipticity of the elemental wires are smaller in a cross section of the water-stopping portion that is taken perpendicular to the longitudinal axis direction of the insulated electric wire than in a cross section of the covered portion that is taken perpendicular to the longitudinal axis direction of the insulated electric wire.

Preferably, in the water-stopping portion, the water-stopping agent is placed surrounding the entire circumference of the conductor. Alternatively, preferably, the water-stopping agent fills a partially filled region which covers partial regions of the conductor in cross sections of the water-stopping portion that are taken perpendicular to the longitudinal axis direction of the insulated electric wire, and the partially filled region covers an area that surrounds the entire circumference of the conductor in a superimposition of the cross sections along the entire water-stopping portion in the longitudinal axis direction.

A wire harness according to the present invention includes the above-described insulated electric wire, and electric connections provided at both ends of the insulated electric wire, the electric connections being capable of connecting to other devices.

Here, preferably, one of the electric connections provided on both ends of the insulated electric wire includes a waterproof structure for preventing entry of water from the outside, and the other one of the electric connections does not include any waterproof structure, and the water-stopping portion is provided at a position between the two electric connections.

According to the present invention, a method for producing an insulated electric wire including a conductor in which a plurality of elemental wires made of a conductive material are twisted together; and an insulation covering that covers an outer circumference of the conductor includes: a partial exposure step of providing an exposed portion in which the insulation covering is removed from the outer circumference of the conductor, and a covered portion in which the insulation covering covers the outer circumference of the conductor, the exposed portion and the covered portion being provided adjacent to each other in a longitudinal axis direction of the insulated electric wire; a filling step of filling gaps between the elemental wires in the exposed portion with a water-stopping agent made of a curable resin composition; and a curing step of curing the water-stopping agent placed in the exposed portion while rotating the insulated electric wire around its axis.

Here, preferably, after the completion of the filling step, the insulated electric wire is rotated around its axis until the curing step is started.

Also, preferably, in the filling step, the gaps between the elemental wires are filled with the water-stopping agent by bringing the exposed portion into contact with a jet flow of the water-stopping agent.

Preferably, a density modification step is executed between the partial exposure step and the filling step, the density modification step increasing distances between the elemental wires in the exposed portion while increasing a density of the conductive material per unit length in the exposed portion, and a retightening step is executed after the execution of the filling step, the retightening step reducing the distances between the elemental wires in the exposed portion while decreasing a twist pitch of the elemental wires.

In this case, preferably, in the filling step, a filled area in which gaps between the elemental wires are filled with the water-stopping agent and that extends over more than half of an area from one end to the other end of the exposed portion in a radial direction, and an unfilled area in which gaps between the elemental wires are not filled with the water-stopping agent are provided adjacent to each other in the radial direction of the exposed portion.

Advantageous Effects of Invention

In the insulated electric wire according to the present invention, the gaps between the elemental wires constituting the conductor are filled with the water-stopping agent, and the surfaces of the elemental wires are in contact with only the water-stopping agent or another elemental wire. That is, the water-stopping agent is distributed so that adjacent elemental wires adhere each other, or the elemental wires and the water-stopping agent adhere each other without another substance such as an air layer interposed therebetween. By filling the gaps between the elemental wires with the water-stopping agent with high uniformity in this way, it is possible to form a water-stopping portion having a superior water-stopping performance that can prevent water from entering the gaps between the elemental wires.

Here, if an area enclosed by the surface of the water-stopping agent does not include any bubbles, or includes only bubbles whose entire circumference is surrounded by the water-stopping agent, it is possible to efficiently improve the water-stopping performance of the water-stopping portion. Even if there is a bubble whose entire circumference is surrounded by the water-stopping agent, and that is located on the outer side of the conductor, this bubble is unlikely to reduce the adhesion of the water-stopping agent to the elemental wires, and is unlikely to affect the water-stopping performance of the water-stopping portion.

If, in a cross section of the water-stopping portion that is taken perpendicular to a longitudinal axis direction of the insulated electric wire, the elemental wires located in an outer circumferential portion of the conductor has a more flattened shape than the elemental wires located inward thereof, the elemental wire located in the outer circumferential portion of the conductor will be largely inclined with respect to the longitudinal axis direction of the insulated electric wire compared to the elemental wire located inward thereof. That is to say, the elemental wires located in the outer circumferential portion are twisted in a spiral shape with a large inclination angle, and this can serve as an indicator that a sufficient amount of water-stopping agent can be held in the gaps between the elemental wires in the exposed portion, and a superior water-stopping performance can be realized.

If ellipticity of the elemental wires are smaller in a cross section of the water-stopping portion that is taken perpendicular to a longitudinal axis direction of the insulated electric wire than in a cross section of the covered portion that is taken perpendicular to the longitudinal axis direction of the insulated electric wire, the elemental wires will be arranged at a large angle with respect to the longitudinal axis direction of the insulated electric wire in the water-stopping portion than in the covered portion. That is to say, the elemental wires are twisted with a smaller pitch in the exposed portion than in the covered portion. By reducing the twist pitch of the elemental wires in the exposed portion, the water-stopping agent placed in a high flowability state in the gaps between the elemental wires is likely to be held between the elemental wires when the water-stopping portion is formed. This makes it easy to form a water-stopping portion having a superior water-stopping performance while eliminating an influence of dropping or flowing of the water-stopping agent.

If in the water-stopping portion, the water-stopping agent is placed surrounding the entire circumference of the conductor, it will be easy to realize a superior water-stopping performance at every position of the water-stopping portion.

Alternatively, if in a cross section of the water-stopping portion that is taken perpendicular to the longitudinal axis direction of the insulated electric wire, a partially filled region that covers a partial region of the conductor is filled with the water-stopping agent, and superimposition of the partially filled region along the entire water-stopping portion in the longitudinal axis direction constitutes an area that surrounds the entire circumference of the conductor, only a partial region of the conductor is filled with the water-stopping agent in a cross section at each position of the water-stopping portion, and thus it will be easy to suppress the amount of use of the water-stopping agent and the outer diameter of the water-stopping portion. On the other hand, the distribution of the water-stopping agent when viewed in the entire water-stopping portion in the longitudinal direction is such that the water-stopping agent is placed surrounding the entire circumference of the conductor, and thus a sufficient water-stopping performance can be realized as the entire water-stopping portion.

The wire harness according to the present invention includes the above-described insulated electric wire, and electric connections capable of connecting to other devices are provided at both ends of the insulated electric wire. Since in the water-stopping portion of the insulated electric wire, the gaps between the elemental wires constituting the conductor are filled with the water-stopping agent, and the surfaces of the elemental wires are in contact with only the water-stopping agent or another elemental wire, a wire harness having a superior water-stopping performance can be realized. Particularly, even if water adheres to one of the electric connections on both sides, it is possible to effectively prevent the water from entering the other electric connection along the conductors constituting the insulated electric wire, and a device connected to this electric connection.

Here, if one of the electric connections provided on the both ends of the insulated electric wire includes a waterproof structure for preventing entry of water from the outside, and the other one of the electric connections does not include any waterproof structure, and the water-stopping portion is provided at a position between the two electric connections, even if water enters the electric connection that does not include any waterproof structure, it is possible to effectively prevent the water from entering the electric connection including the waterproof structure along the conductors constituting the insulated electric wire, and a device connected to this electric connection. Accordingly, it is possible to improve the effectiveness of the waterproof characteristic with the waterproof structure formed in one electric connection, and effectively protect a device in which this electric connection is formed from the entry of water.

In the method for producing the insulated electric wire, in the filling step, the gaps between the elemental wires in the exposed portion are filled with a water-stopping agent made of a curable resin composition, and then, in the curing step, the water-stopping agent placed in the exposed portion is cured while rotating the insulated electric wire around its axis. By rotating the insulated electric wire around its axis, the water-stopping agent can be cured with an increased uniformity in the spatial distribution of the uncured water-stopping agent. Accordingly, the water-stopping agent can be cured at every position of the water-stopping portion with high uniformity while adhering to the elemental wires, and an insulated electric wire provided with a water-stopping portion having a superior water-stopping performance is produced.

Here, after the completion of the filling step, rotating the insulated electric wire around its axis until the curing step is started brings about a particularly advantageous effect of increasing the uniformity of the spatial distribution of the uncured water-stopping agent. Accordingly, an insulated electric wire provided with a water-stopping portion having a particularly superior water-stopping performance is easily produced.

Also, if in the filling step, the gaps between the elemental wires are filled with the water-stopping agent by bringing the exposed portion into contact with a jet flow of the water-stopping agent, it will be easy to fill the gaps between the elemental wires with the water-stopping agent while suppressing generation of a bubble.

If a density modification step is executed between the partial exposure step and the filling step, the density modification step increasing distances between the elemental wires in the exposed portion while increasing a density of the conductive material per unit length in the exposed portion, and a retightening step is executed after the execution of the filling step, the retightening step reducing the distances between the elemental wires in the exposed portion while decreasing a twist pitch of the elemental wires, the increasing the gaps between the elemental wires in the exposed portion in the density modification step will make it easy to perform the filling of the gaps between the elemental wires with the water-stopping agent in the filling step efficiently and uniformly. Furthermore, by executing the retightening step after the filling step, the water-stopping agent placed in the filling step is easily held in the gaps between the elemental wires, and thus the obtained insulated electric wire is likely to have an excellent water-stopping performance. Also, by executing the retightening step, in a cross section of the water-stopping portion, the elemental wires constituting the conductor in the exposed portion, namely, the elemental wires located in the outer circumferential portion of the conductor can easily have a flattened shape.

In this case, in the configuration in which in the filling step, a filled area in which gaps between the elemental wires are filled with the water-stopping agent and that extends over more than half of an area from one end to the other end of the exposed portion in a radial direction, and an unfilled area in which gaps between the elemental wires are not filled with the water-stopping agent are provided adjacent to each other in the radial direction of the exposed portion, even if only a partial region of the exposed portion in the radial direction is filled with the water-stopping agent in the filling step, executing the retightening step after the filling step makes it possible for the water-stopping agent to be distributed over a wide area of the conductor in the radial direction. Accordingly, it is possible to form a water-stopping portion having a superior water-stopping performance while suppressing the amount of use of the water-stopping agent.

BRIEF DESCRIPTION OF DRAWINGS

FIG. 4(a) is a side view thereof, and FIGS. 4(b) and 4(c) are respectively cross-sectional views taken along lines A-A and B-B in FIG. 4(a).

FIG. 7(a) illustrates the wire before a water-stopping portion is formed, FIG. 7(b) illustrates a partial exposure step, and FIG. 7(c) illustrates a tightening step.

FIG. 8(a) illustrates a loosening step, FIG. 8(b) illustrates a filling step, and FIG. 8(c) illustrates a retightening step.

FIG. 9(a) illustrates a covering movement step, and FIG. 9(b) illustrates a curing step.

FIG. 10(a) is a side view of a elemental wire, and FIG. 10(b) is a cross-sectional view illustrating one pitch of the twist.

FIG. 11(a) shows the cross-section according to an example, and FIG. 11(b) shows the cross-section according to a comparative example.

DESCRIPTION OF EMBODIMENTS

A detailed description of an insulated electric wire, a wire harness, and a production method for producing the insulated electric wire according to embodiments of the present invention will now be provided with reference to the drawings.

[Configuration of Insulated Electric Wire According to First Embodiment]

Overview of Insulated Electric Wire

Figure 1:
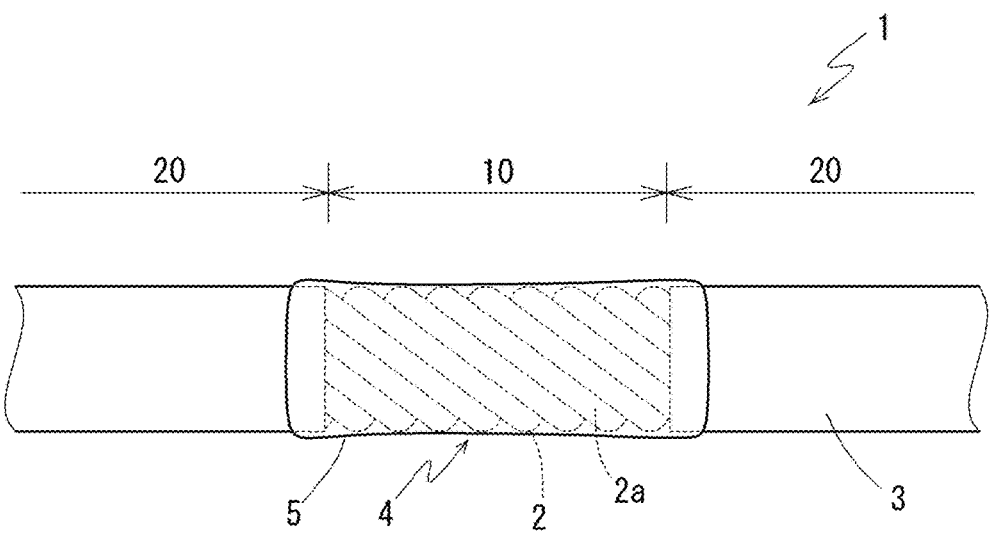
FIG. 1 is a perspective side view illustrating an insulated electric wire according to a first embodiment of the present invention.

FIG. 1 illustrates an overview of an insulated electric wire 1 according to a first embodiment of the present invention. The insulated electric wire 1 includes a conductor 2 in which a plurality of elemental wires 2a made of a metal material are twisted together, and an insulation covering 3 that covers the outer circumference of the conductor 2. A water-stopping portion 4 is formed in a middle portion of the insulated electric wire 1 in a longitudinal axis direction thereof.

The elemental wires 2a constituting the conductor 2 may be made of any kind of conductive material, and copper is typically used as the material of the conductor of the insulated electric wire. Instead of copper, metal materials such as aluminum, magnesium, and iron may also be used. The metal material may be an alloy. Examples of other metal materials that can be used to form an alloy include iron, nickel, magnesium, silicon, and combinations thereof. All of the elemental wires 2a may be made of the same metal material, or may include elemental wires 2a made of multiple metal materials There is no particular limitation to the twist structure of the elemental wires 2a of the conductor 2, but a simple twist structure is preferable in view of, for example, easily increasing distances between the elemental wires 2a when the water-stopping portion 4 is formed. For example, a twist structure in which the elemental wires 2a are collectively twisted all together is preferred rather than a master-slave twist structure in which a plurality of strands each containing a plurality of twisted elemental wires 2a are gathered and further twisted. Also, there is no particular limitation to the diameter of the whole conductor 2 and the diameter of each elemental wire 2a. However, the effect and significance of filling minute gaps between the elemental wires 2a in the water-stopping portion 4 with the water-stopping agent 5 to improve reliability of the water-stopping characteristic is greater as the diameters of the whole conductor 2 and each elemental wire 2a are smaller, and thus it is preferable that the cross section of the conductor be about 8 mm$^2$ or smaller and the diameter of individual elemental wires be about 0.45 mm or smaller.

There is no particular limitation to the material constituting the insulation covering 3 as long as it is an insulating polymer material. Examples of such materials include a polyvinyl chloride (PVC) resin and an olefin-based resin. In addition to the polymer material, a filler or an additive may be contained as appropriate. Further, the polymer material may be cross-linked.

The water-stopping portion 4 includes an exposed portion 10 in which the insulation covering 3 is removed from the outer circumference of the conductor 2. In the exposed portion 10, gaps between the elemental wires 2a constituting the conductor 2 are filled with the water-stopping agent 5.

Preferably, in the exposed portion 10, the water-stopping agent 5 also covers the outer circumference of the conductor 2 continuously from the gaps between the elemental wires 2a in the exposed portion 10. Furthermore, as shown in FIG. 1, the water-stopping agent 5 is preferably placed on the outer circumferences of end portions of covered portions 20 adjacent to both sides of the exposed portion 10, that is, the outer circumferences of end portions of the insulation covering 3 in areas in which the insulation covering 3 covers the outer circumference of the conductor 2, continuously from the gaps between the elemental wires 2a and the outer circumferential portion of the conductor 2 in the exposed portion 10. In this case, the water-stopping agent 5 continuously covers the outer circumference, specifically in the present embodiment, the entire circumferential portion of an area extending from an end portion of the covered portion 20 located on one side of the exposed portion 10 to an end portion of the covered portion 20 located on the other side of the exposed portion 10. Further, the water-stopping agent 5 fills up the areas between the elemental wires 2a in the exposed portion 10 continuously from that outer circumferential portion. A distribution of the water-stopping agent 5 in the water-stopping portion 4 will be described in detail later.

There is no particular limitation to the material constituting the water-stopping agent 5 as long as it is a resin composition through which a fluid such as water is unlikely to pass and that can exhibit a water-stopping performance. However, the water-stopping agent 5 is preferably made of a thermoplastic resin composition or a curable resin composition due to the reason that it easily fills up the gaps between the elemental wires 2a in a high flowability state, for example. By placing such a resin composition in a high flowability state between the elemental wires 2a and on the outer circumferences (outer circumferential areas) of end portions of the exposed portion 10 and the covered portions 20, and then bringing the resin composition to a low flowability state, it is possible to reliably form a water-stopping portion 4 having a superior water-stopping performance. Among the materials, a curable resin is preferably used as the water-stopping agent 5. A curable resin is a resin having one or more of types of curability such as heat curability, light curability, moisture curability, two-component curability, and anaerobic curability. Specifically, the resin composition constituting the water-stopping agent 5 preferably has light curability, specifically ultraviolet curability, in view of curing the water-stopping agent 5 placed in gaps between the elemental wires 2a and in the outer circumferential areas of the end portions on the exposed portion 10 and the covered portions 20 in a short time, and forming the water-stopping portion 4 with a highly uniform distribution of the water-stopping agent 5. Furthermore, the resin composition constituting the water-stopping agent 5 preferably has anaerobic curability, that is, the property of being cured upon contact with a metal in a state in which molecular oxygen is blocked, in view of curing the water-stopping agent 5 in a state in which it adheres to the surface of the elemental wires 2a.

There is no particular limitation to the specific type of the resin constituting the water-stopping agent 5. Examples of the resin include silicone resins, acrylic resins, epoxy resins, and urethane resins. To the resin material, various kinds of additives can be appropriately added as long as the characteristics of the resin material as the water-stopping agent 5 are not deteriorated. Also, it is preferable to use only one type of water-stopping agent 5 in view of simplicity of the configuration, but two or more types of water-stopping agent 5 may also be combined or stacked, for example, as appropriate. The water-stopping agent 5 is preferably made of an insulating material in view of insulating the conductor 2 from the outside.

It is preferable that the water-stopping agent 5 be a resin composition having a viscosity of at least 4 Pa·s, more preferably at least 5 Pa·s, still more preferably at least 10 Pa·s upon filling. This is because, when the water-stopping agent 5 is placed at the areas between the elemental wires 2a and on the outer circumferential areas, especially on the outer circumferential areas, the water-stopping agent 5 hardly drops or flows and is likely to stay at the areas with high uniformity. On the other hand, it is preferable that the viscosity of the water-stopping agent 5 upon filing be kept at 200 Pa·s at the most. This is because, when the viscosity is not too high, the water-stopping agent 5 is likely to permeate into the areas between the elemental wires 2a sufficiently.

As described above, when the gaps between the elemental wires 2a in the exposed portion 10 are filled with the water-stopping agent 5, water stopping is realized at the areas between the elemental wires 2a, and a fluid such as water is prevented from entering the areas between the elemental wires 2a from the outside. Also, even if water enters a gap between the elemental wires 2a in one portion of the insulated electric wire 1, the water is prevented from moving to another portion of the insulated electric wire 1 along the elemental wires 2a. For example, water adhering to one end of the insulated electric wire 1 can be prevented from moving toward the other end of the insulated electric wire 1 through a gap between the elemental wires 2a.

If the water-stopping agent 5 covers the outer circumferential portion of the conductor 2 in the exposed portion 10, the water-stopping agent 5 also has the function of physically protecting the exposed portion 10. In addition, if the water-stopping agent 5 is made of an insulating material, the water-stopping agent 5 also has the function of insulating the conductor 2 in the exposed portion 10 from the outside. Also, since the water-stopping agent 5 also covers the outer circumferences of the end portions of the covered portions 20 adjacent to the exposed portion 10 as one piece, water stopping is possible between the insulation covering 3 and the conductor 2. That is to say, a fluid such as water is prevented from entering the gap between the insulation covering 3 and the conductor 2 from the outside. Also, even if water enters a gap between the insulation covering 3 and the conductor 2 in one portion of the insulated electric wire 1, the water is prevented from moving to another portion of the insulated electric wire 1 through the gap between the insulation covering 3 and the conductor 2. For example, water adhering to one end of the insulated electric wire 1 can be prevented from moving toward the other end of the insulated electric wire 1 through the gap between the insulation covering 3 and the conductor 2.

Note that in the present embodiment, the water-stopping portion 4 is provided in a middle portion of the insulated electric wire 1 in the longitudinal axis direction thereof in view of the magnitude of demand, easiness in increasing the distances between the elemental wires 2a, and the like, but the same water-stopping portion 4 may also be provided at an end portion of the insulated electric wire 1 in the longitudinal axis direction thereof. In this case, another member such as a terminal may be connected to the end portion of the insulated electric wire 1, or no member may be connected thereto. Also, the water-stopping portion 4 covered with the water-stopping agent 5 may include, in addition to the conductor 2 and the insulation covering 3, another member such as a connection member. Examples of the case where the water-stopping portion 4 includes another member include a case where the water-stopping portion 4 includes a splice portion in which a plurality of insulated electric wires 1 are joined to each other.

Figure 2:
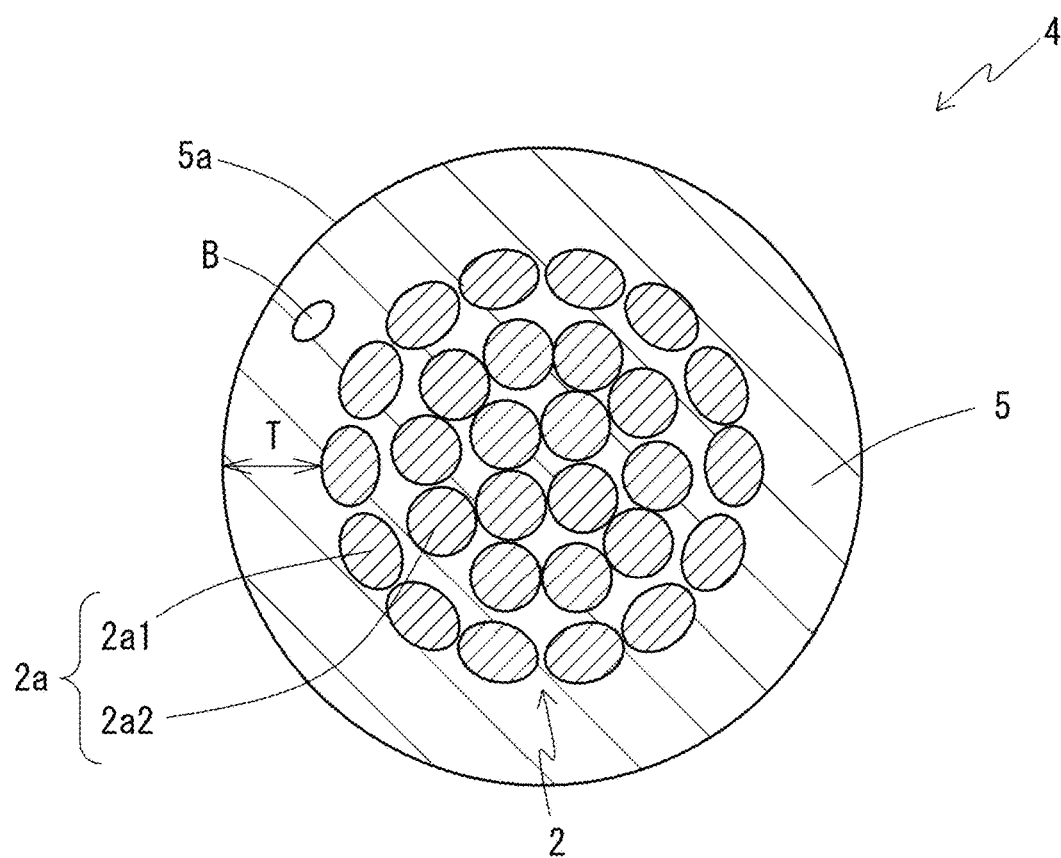
FIG. 2 is a cross-sectional view illustrating a water-stopping portion of the above-described insulated electric wire.
Figure 3:
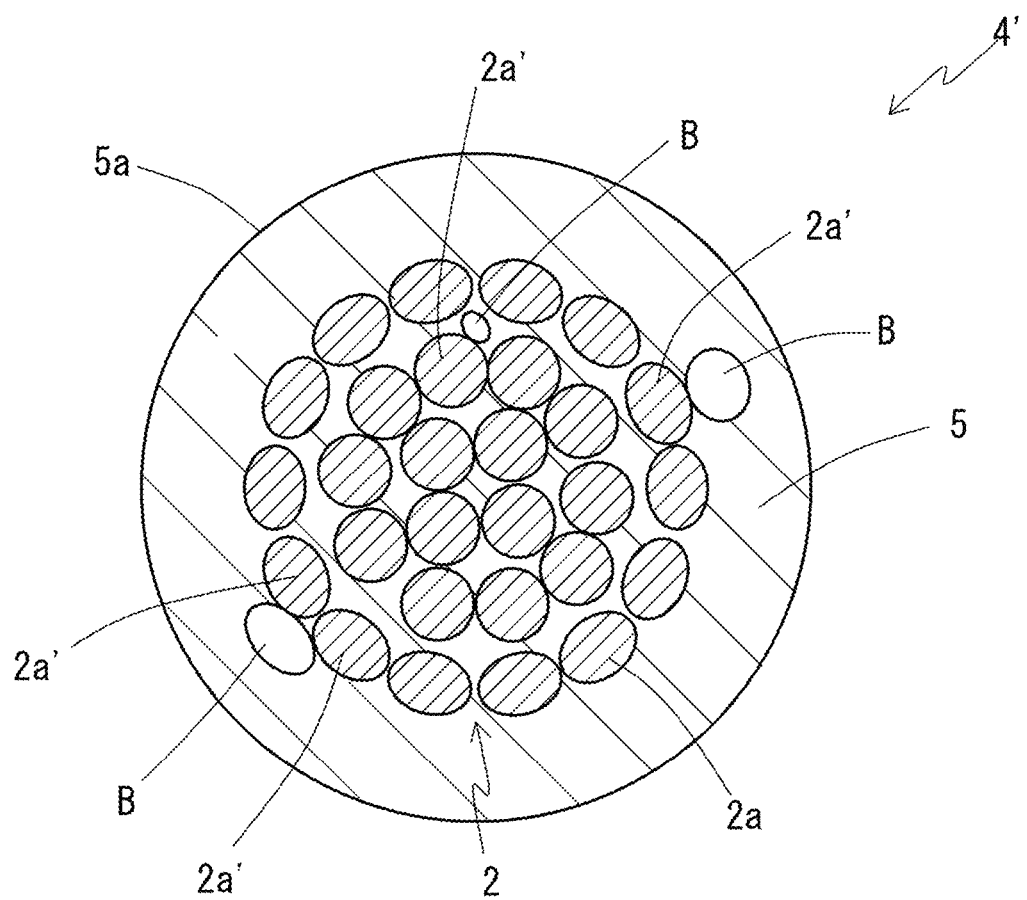
FIG. 3 is a cross-sectional view illustrating a water-stopping portion in which a water-stopping agent includes bubbles that are in contact with elemental wires.

State of Distribution and Cross Section of Water-Stopping Agent in Water-Stopping Portion As described above, in the water-stopping portion 4 of the insulated electric wire 1 according to the present embodiment, the area including the gaps between the elemental wires 2a constituting the conductor 2 in the exposed portion 10 is filled with the water-stopping agent 5. In order to realize a water-stopping portion 4 having a sufficiently good water-stopping performance, the spatial distribution of the water-stopping agent 5 in the water-stopping portion 4 is essential. Hereinafter, the spatial distribution of the water-stopping agent 5 will be described with reference to the cross-sectional views of water-stopping portions 4 and 4' in FIGS. 2 and 3. FIG. 2 shows a cross section of the water-stopping portion 4 of the insulated electric wire 1 with a superior water-stopping performance according to the present embodiment, taken perpendicular to the longitudinal axis direction of the insulated electric wire 1. FIG. 3 shows a cross section of a water-stopping portion 4' that is unlikely to exhibit a sufficient water-stopping performance, taken perpendicular to the longitudinal axis direction of the insulated electric wire 1. Hereinafter, unless otherwise noted, in the description of the states of the distributions and cross sections of the water-stopping agent 5 in the water-stopping portions 4 and 4', the cross section refers to a cross section of the water-stopping portion 4 or 4', taken perpendicular to the longitudinal axis direction of the insulated electric wire 1.

As shown in FIG. 2, in an area enclosed by a surface 5a of the water-stopping agent 5 in the water-stopping portion 4 of the insulated electric wire 1 according to the present embodiment, the surface of elemental wires 2a is in contact with the water-stopping agent 5 or other elemental wires 2a. In other words, the surface of each elemental wire 2a included in the conductor 2 is in contact with the water-stopping agent 5 or another elemental wire 2a adjacent to that elemental wire 2a, and is not in contact with any substance other than the water-stopping agent 5 and the constituent material of the elemental wires 2a, such as bubbles B in which a defect of the water-stopping agent 5 is filled with air, and liquid bubbles formed as a result of a liquid such as water entering the bubble B. The water-stopping agent 5 densely fills up the gaps between the elemental wires 2a and adheres to the surface of the elemental wires 2a without the interposition of any bubble B or the like.

FIG. 3 shows the water-stopping portion 4' in which the surfaces of some elemental wires 2a are partially in contact with bubbles B, in contrast to the water-stopping portion 4 in FIG. 2. In FIG. 3, four elemental wires 2a denoted by the reference numeral 2a' are in contact with bubbles B. When there are bubbles B that are in contact with the elemental wires 2a in this way, the bubbles B serve as an entry path for water and increase the likelihood that water enters an area between the elemental wires 2a. Also, when an external force is applied to the water-stopping portion 4', for example, the bubbles B may function as a start position at which damage such as a crack occurs, and water may enter an area between the elemental wires 2a via the generated damaged portion. The water that has entered the area between the elemental wires 2a via the bubbles B or the damaged portion may move to another portion of the insulated electric wire 1 such as the covered portion 20 via the elemental wires 2a. Accordingly, if a bubble B is present that is in contact with a elemental wire 2a in the water-stopping agent 5 constituting the water-stopping portion 4', it is difficult to sufficiently increase the water-stopping performance of the water-stopping portion 4'.

In contrast, as shown in FIG. 2, when the surface of the elemental wires 2a is in contact with the water-stopping agent 5 or another elemental wire 2a, and no bubble B that is in contact with a elemental wire 2a is present in the area enclosed by the surface 5a of the water-stopping agent 5, a situation where water enters an area between the elemental wires 2a via a bubble B, or where a bubble B causes damage that may serve as an entry path for water is unlikely to occur. In the water-stopping portion 4, the water-stopping agent 5 adhering to the surfaces of the elemental wires 2a can effectively prevent entry of water into an area between the elemental wires 2a. It is also possible to effectively prevent water that has entered an area between the elemental wires 2a in one portion of the insulated electric wire 1 from moving to another portion of the insulated electric wire 1 along the elemental wires 2a. Thus, by bringing the surface of the elemental wires 2a in the water-stopping portion 4 into contact with the water-stopping agent 5 or another elemental wire 2a, and eliminating any bubbles B that are in contact with the elemental wires 2a, it is possible to configure a water-stopping portion 4 having a superior water-stopping performance.

Here, the surface of a elemental wire 2a may be in contact with the water-stopping agent 5 or another elemental wire 2a, but a better water-stopping performance can be realized when the surface is in contact only with the water-stopping agent 5, because by directly adhering to the elemental wire 2a, the water-stopping agent 5 particularly effectively prevents this elemental wire 2a from coming into contact with water. However, also when the surface of a elemental wire 2a is in contact with another elemental wire 2a, water cannot enter a contact interface between the two adjacent elemental wires 2a that are in contact with each other, and a sufficiently good water-stopping performance can be ensured. Due to the absence of bubbles B that are in contact with the elemental wires 2a, the positional relationship between the adjacent elemental wires 2a hardly changes, and a state in which water cannot enter the contact interface between the adjacent elemental wires 2a is maintained.

The cross section of the water-stopping portion 4 may include bubbles B that are not in contact with any elemental wire 2a but are surrounded over their entire circumference by the water-stopping agent 5, rather than bubbles B that are in contact with a elemental wire 2a as shown in FIG. 3. Ideally, it is preferable that no kind of bubble B is included in the area enclosed by the surface 5a of the water-stopping agent 5, but even if there is a bubble B, this will not significantly reduce the water-stopping performance of the water-stopping portion 4 as long as the bubble B is not in contact with a elemental wire 2a. For example, there may be bubbles B whose entire circumference is surrounded by the water-stopping agent 5 on the outer side of the area constituted by the conductor 2. Also, in the configuration shown in FIG. 2, there is such a bubble B whose entire circumference is surrounded by the water-stopping agent 5 on the outer side of the conductor 2.

Note that, as described above, bubbles B that are in contact with a elemental wire 2a are a cause of a reduction in the water-stopping performance, but if, for example, the required level of water-stopping performance is low, a desired water-stopping performance may be satisfied despite of the presence of bubbles B that are in contact with a elemental wire 2a, as long as the amount or the size of such bubbles B is small. For example, in a cross section of the water-stopping portion 4, it is preferable that the sum of the cross-sectional areas of bubbles B that are in contact with the elemental wires 2a be not more than 5% of the sum of the cross-sectional areas of the elemental wires 2a. It is also preferable that the cross-sectional area of each bubble B that is in contact with a elemental wire 2a be not more than 80% of the cross-sectional area of one elemental wire 2a. On the other hand, even bubbles B whose entire circumference is surrounded by the water-stopping agent 5 and that are not in contact with a elemental wire 2a may affect the water-stopping performance of the water-stopping portion 4, if they are located close to the elemental wire 2a. Accordingly, it is preferable that a bubble B and a elemental wire 2a be provided at a distance of at least 30% of the diameter of the elemental wire 2a, and the space therebetween be filled with the water-stopping agent 5.

Furthermore, it is preferable that, in a cross section of the water-stopping portion 4, the elemental wires 2a located in the outer circumferential portion of the conductor 2 have a more flattened shape than the elemental wires 2a located inward thereof. Also in FIG. 2, elemental wires 2a1 located in the outer circumferential portion of the conductor 2 have a flattened and substantially ellipsoidal cross-section. Elemental wires 2a2 located inward of the elemental wires 2a1, which are located in the outer circumferential portion of the conductor, have a less flattened cross-section.

If the elemental wires 2a constituting the conductor 2 are twisted in a gentle spiral shape with a relatively small inclination angle, the axial direction of the elemental wires 2a is oriented in a direction close to the longitudinal axis direction of the insulated electric wire 1, and thus a cross section of the elemental wire 2a taken perpendicular to the longitudinal axis direction of the insulated electric wire 1 has a shape that is substantially circular and is less flattened. By contrast, if the elemental wires 2a constituting the conductor 2 are twisted in a steep spiral shape with a relatively large inclination angle, the axial direction of the elemental wires 2a is oriented in a direction largely inclined with respect to the longitudinal axis direction of the insulated electric wire 1, and thus if a elemental wire 2a is cut perpendicular to the longitudinal axis direction of the insulated electric wire 1, the elemental wire 2a will be cut at an angle with respect to the axis direction of the elemental wire 2a. Accordingly, the cross section of the elemental wire 2a has a flattened shape that can be approximated to an ellipse. Thus, the above description of the elemental wires 2a1 located in the outer circumferential portion of the conductor 2 in the cross section of the water-stopping portion 4 having a more flattened shape than the elemental wires 2a2 located inward thereof means that the elemental wires 2a1 located in the outer circumferential portion of the conductor 2 are twisted in a steep spiral shape with a large inclination angle, compared to the spiral shape of the inner elemental wires 2a2.

As described above, the water-stopping portion 4 can be formed by filling the areas between the elemental wires 2a with the water-stopping agent 5 in a high flowability state, and then decreasing the flowability, and by twisting the elemental wires 2a1 located in the outer circumferential portion of the conductor 2 in a steep spiral state with a large inclination angle with the areas between the elemental wires 2a filled with the water-stopping agent 5 in a high flowability state, the water-stopping agent 5 filling up the areas is unlikely to drop or flow to the outside of the conductor 2, and stay in the areas between the elemental wires 2a with high uniformity. As a result, the areas between the elemental wires 2a are filled with a sufficient amount of water-stopping agent 5, and a water-stopping portion 4 having a superior water-stopping performance is easily formed. Specifically, when, as will be described later as a method for producing the insulated electric wire 1, a production method is used in which the distances between the elemental wires 2a in the exposed portion 10 are increased while increasing the density of the conductive material per unit length in the exposed portion 10 (density modification step), and in this state, the gaps between the elemental wires 2a are filled with the water-stopping agent 5 (filling step), and after the filling step, the distances between the elemental wires 2a in the exposed portion 10 are reduced while decreasing the twist pitch of the elemental wires 2a (retightening step), the cross-sectional shape of the elemental wires 2a1 in the outer circumferential portion of the conductor 2 is likely to be flattened, and it is thus advantageous in that the water-stopping agent 5 is easily held in the gaps between the elemental wires 2a. Thus, the feature of the elemental wires 2a1 in the outer circumferential portion of the conductor 2 having a flattened cross-sectional shape is an indicator used when a water-stopping portion 4 having a superior water-stopping performance is formed.

An ellipticity can be used as a specific indicator for evaluating the level of flatness of the cross-sectional shape of the elemental wires 2a. The ellipticity is obtained by dividing the length of the short axis (short diameter) of a cross-sectional shape by the length of the long axis (long diameter), i.e. (short diameter/long diameter). The smaller the value of the ellipticity is, the more flattened the cross-sectional shape is. In a cross section of the water-stopping portion 4, the ellipticity of the elemental wires 2a1 located in the outer circumferential portion of the conductor 2 preferably has a value less than the value of the ellipticity of the elemental wires 2a2 located inward thereof. Furthermore, the ellipticity of the elemental wires 2a1 located in the outer circumferential portion of the conductor 2 is preferably not greater than 0.95. This brings about an effect of configuring the water-stopping portion 4 in which a sufficient amount of water-stopping agent 5 is held between the elemental wires 2a, and has a superior water-stopping performance. On the other hand, the ellipticity of the elemental wires 2a1 located in the outer circumferential portion of the conductor 2 is preferably at least 0.50. This makes it possible to suppress a difference in the actual length between the elemental wires 2a1 located in the outer circumferential portion of the conductor and the elemental wires 2a2 located inward thereof within a range in which the above-described effect of improving the water-stopping performance is not saturated.

It is preferable that in a cross section of the water-stopping portion 4, the ellipticity of the elemental wires 2a1 located in the outer circumferential portion of the conductor 2 be smaller than the ellipticity of the elemental wires 2a2 located inward thereof, and the ellipticities of the elemental wires 2a1 and 2a2 in a cross section of the water-stopping portion 4, particularly, the ellipticity of the elemental wires 2a1 located in the outer circumferential portion be smaller than the values of the ellipticities of the elemental wires 2a in a cross section of the covered portion 20 (specifically, a later-described remote area 22) that is taken perpendicular to the longitudinal axis direction of the insulated electric wire 1. This means that the twist pitch of the elemental wires 2a is smaller in the exposed portion 10 constituting the water-stopping portion 4 than in the covered portions 20. As described above, with the production method in which the distances between the elemental wires 2a in the exposed portion 10 are increased (density modification step), and in this state, the gaps between the elemental wires 2a are filled with the water-stopping agent 5 (filling step), and after the filling step, the distances between the elemental wires 2a in the exposed portion 10 are reduced while decreasing the twist pitch of the elemental wires 2a (retightening step), an advantageous effect of easily holding the water-stopping agent 5 in the gaps between the elemental wires 2a is realized. Also, by decreasing the twist pitch of the elemental wires 2a in the exposed portion 10 relative to the twist pitch in the covered portions 20 in the retightening step, the effect of holding the water-stopping agent 5 in the gaps between the elemental wires 2a is particularly improved. Accordingly, the feature of the ellipticity of the elemental wires 2a in a cross-section being smaller in the exposed portion 10 than in the covered portion 20 functions as a good indicator for use when the water-stopping portion 4 having a superior water-stopping performance is formed.

Figure 10:
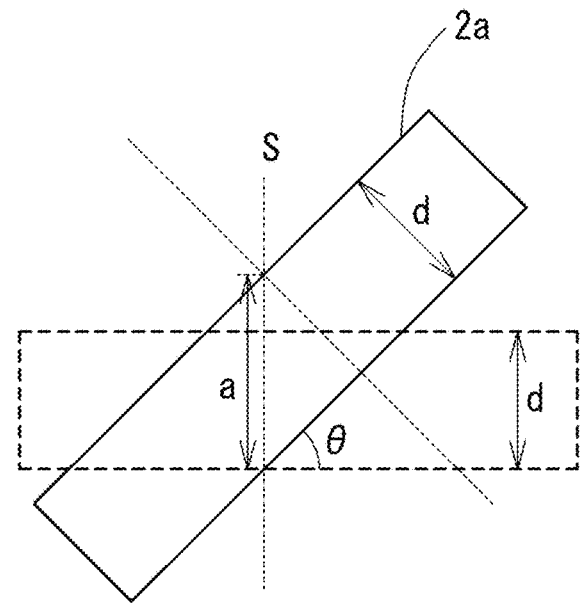
FIGS. 10(a) and 10(b) are conceptual views illustrating the relationship between an ellipticity and a twist pitch of the elemental wires in a cross section of the conductor.
Figure 10:
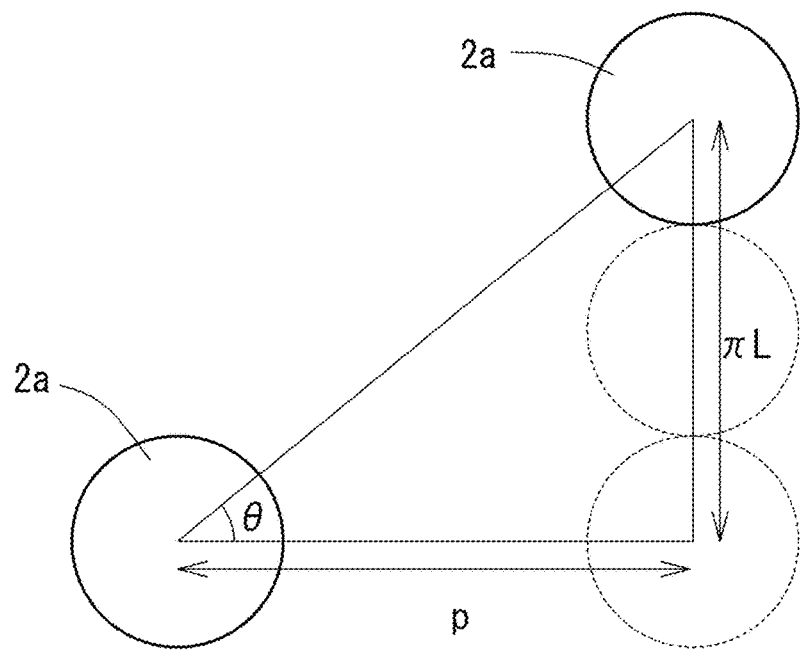

The following will describe the relationship between the ellipticity and the twist pitch of the elemental wires 2a in a cross-section with reference to simplified models shown in FIG. 10. In FIG. 10(a), a elemental wire 2a with an outer diameter d in a solid line is twisted while being inclined by an angle θ, from a state in a dotted line in which the elemental wire 2a is oriented along the axis of the insulated electric wire 1. When the inclined elemental wire 2a is cut along a cross-section S that is perpendicular to the axis of the insulated electric wire 1, the ellipticity £ of the elemental wire 2a is given as c=d/a, where a is the length of the long axis of the cross-section. Because of a=d/cosh, c=cosθ. Here, as shown in FIG. 10(b), for one pitch of a twist structure expressed by a length p, the elemental wire 2a is regarded as moving along the radial direction by a distance πL. At this time, the inclination angle θ is given by θ=arctan (πL/p). Here, when the twist pitch is multiplied by n, and the inclination angle is θn, θn=arctan(πL/np)=arctan(tan θ/n). As described above, when the inclination angle of the elemental wire 2a is θ, the ellipticity of a cross section of the elemental wire 2a is given as ε=cosθ, and when the inclination angle is $θ_n$, the ellipticity is given as ε=cosθ$_n$=cos(arctan(tan θ/n). This is a monotonically increasing function with respect to n. That is to say, the ellipticity ε of the elemental wire 2a in a cross-section increases the larger the twist pitch of the elemental wire 2a is. If seven elemental wires 2a are twisted together to constitute the conductor 2, it is possible to approximate L=2d, as indicated by the dotted line in FIG. 10(b). Note that examples of the method for measuring the outer diameter d of a elemental wire 2a include a measurement method using a laser measuring device. In this case, values obtained by performing measurement about thirty times at several different positions in the longitudinal direction of the elemental wire 2a may be averaged and the obtained average may be used as the outer diameter d. If the conductor 2 is covered with the insulation covering 3, the insulation covering 3 may be removed by shaving using a stripper or a cutter, burning off, or the like, and then the measurement may be performed.

Furthermore, a water-stopping agent filling rate can be used as an indicator for evaluating whether or not the gaps between elemental wire 2a in the water-stopping portion 4 are filled with a sufficient amount of water-stopping agent 5. A water-stopping agent filling rate is defined as a ratio of an area (A1) of a region between the elemental wires 2a filled with the water-stopping agent 5 to an area (A0) of a region enclosed by the conductor 2 in a cross section of the water-stopping portion 4 (A1/A0×100%). For example, in a cross section of the water-stopping portion 4, using the area (A0) of the polygonal region obtained by connecting the centers of the elemental wires 2a1 located in the outer circumferential portion of the conductor 2 together as a reference, a water-stopping agent filling rate can be calculated as a ratio of the area (A1) of the region filled with the water-stopping agent 5 to the area (A0). For example, if the water-stopping agent filling rate is at least 5%, and specifically at least 10%, it is conceivable that the gaps between the elemental wires 2a are filled with an amount of water-stopping agent 5 that is sufficient for ensuring a superior water-stopping performance. On the other hand, the water-stopping agent filling rate is preferably kept at not greater than 90%, in view of avoiding the use of an excessive amount of water-stopping agent 5.

Also, as described above, the surface of a elemental wire 2a may be in contact with the water-stopping agent 5, or may be in contact with another elemental wire 2a, but it is preferable that the surface be in contact only with the water-stopping agent 5 in view of easily ensuring a superior water-stopping performance. Based on this view, in a cross section of the water-stopping portion 4, the sum of the lengths of the portions in the circumference of the elemental wires 2a that are not in contact with adjacent elemental wires 2a but are in contact with the water-stopping agent 5 is preferably at least 80% of the sum of the circumferential lengths of all the elemental wires 2a. Also, since it is easier to fill a gap between elemental wires 2a with the water-stopping agent 5 when the distance between the adjacent elemental wires 2a is sufficiently large, it is preferable that a cross section of the water-stopping portion 4 include a portion in which the distance between adjacent elemental wires 2a is at least 30% of the outer diameter of the elemental wires 2a.

The distribution of the water-stopping agent 5 in the water-stopping portion 4 also affects the characteristics of the water-stopping portion 4 other than the water-stopping performance. As described above, by placing the water-stopping agent 5 not only in the gaps between the elemental wires 2a in the water-stopping portion 4 but also in the outer circumferential portion of the conductor 2, the water-stopping agent 5 can function as a protection member and an insulating member for the conductor 2. In this case, the uniformity in the physical characteristics of the layer of the water-stopping agent 5 can be increased the more uniform the thickness of the layer of the water-stopping agent 5 placed on the outer circumference of the conductor 2 in the circumferential direction of the conductor 2 is, and the water-stopping agent 5 has good characteristics as a protection member and an insulating member. For example, if the thickness of the layer of the water-stopping agent 5 largely varies, the material strength or the water-stopping performance of the water-stopping agent 5 may be impaired in a portion in which the layer thickness of the water-stopping agent 5 is low, while the water-stopping agent 5 is likely to be damaged due to a contact with an external object in a portion in which the layer thickness of the water-stopping agent 5 is high. However, such a situation can be easily avoided when the layer of the water-stopping agent 5 has a highly uniform thickness, and a high and uniform performance is likely to be realized over the entire circumference.

The uniformity in the thickness of the layer of the water-stopping agent 5 can be evaluated using its eccentricity. The thickness of the layer of the water-stopping agent 5 in a cross section of the water-stopping portion 4 can be measured as a distance T between the surface 5a of the water-stopping agent 5 and the outer circumference of the conductor 2. Also, for the measured distance T, an eccentricity can be estimated as a ratio of the minimum value of the entire circumference to the maximum value thereof (minimum value/maximum value×100%). If this eccentricity is defined as at least 70%, the thickness of the water-stopping agent 5 has sufficiently high uniformity, and it is easy to form the water-stopping portion 4 that has a superior water-stopping performance and good characteristics as a protection member and an insulating member.

A preferred aspect of the state such as the distribution of the water-stopping agent 5 in a cross section of the water-stopping portion 4 has been described, in view of improving the characteristics of the water-stopping portion 4 such as the water-stopping performance. Here, a cross-section serving as an evaluation target may be a representative portion of the water-stopping portion 4, for example, a cross section of a central portion of the water-stopping portion 4 in the longitudinal axis direction. In this cross-section serving as evaluation target, it is preferable that the above-described features be satisfied.

Difference in State of Electric Wire Conductor Between in Water-Stopping Portion and in Another Portion As described above, in the water-stopping portion 4 of the insulated electric wire 1 according to the present embodiment, it is preferable that a cross-section have a predetermined state such as a distribution state of the water-stopping agent 5, in view of improving the characteristics of the water-stopping portion 4 such as the water-stopping performance. In addition, it is further advantageous in view of placing and holding the water-stopping agent 5 in a predetermined region such as the gaps between the elemental wires 2a, when the state of the conductor 2 in the exposed portion 10 included in the exposed portion 4 has the following features, in comparison with the state of the conductor 2 in another portion of the insulated electric wire 1.

First, in the insulated electric wire 1, preferably, the density of the metal material per unit length (per unit length of the insulated electric wire 1 in the longitudinal axis) is not uniform and has a nonuniform distribution. Note that each of the elemental wires 2a is defined as a wire having a substantially uniform diameter continuously along the entire longitudinal axis of the insulated electric wire 1. In the present specification, the state where the density of the metal material per unit length is different between areas is defined as a state where the diameter and the number of the elemental wires 2a are constant, but the state of assembly of the elemental wires 2a such as the state of twist of the elemental wires 2a is different.

Specifically, it is preferable that the density of the metal material of the conductor 2 per unit length be higher in the exposed portion 10 than in the covered portions 20 covered by the insulation covering 3. However, the density of the metal material per unit length may be partially lower in adjacent areas 21 of the covered portions 20 that are immediately adjacent to the exposed portion 10 than in the exposed portion 10. In other words, the density of the metal material per unit length is higher in the exposed portion 10 than at least in remote areas 22 of the covered portions 20 other than adjacent areas 21. In the remote areas 22, the state of the conductor 2 such as the density of the metal material per unit length is substantially equal to the state of the insulated electric wire 1 in which no water-stopping portion 4 is formed. Note that possible reasons why the density of the metal material can be reduced in the adjacent areas 21 include that the metal material is shifted to the exposed portion 10, and that the conductor 2 is deformed to ensure the continuation between the exposed portion 10 and the covered portions 20.

Figure 7:
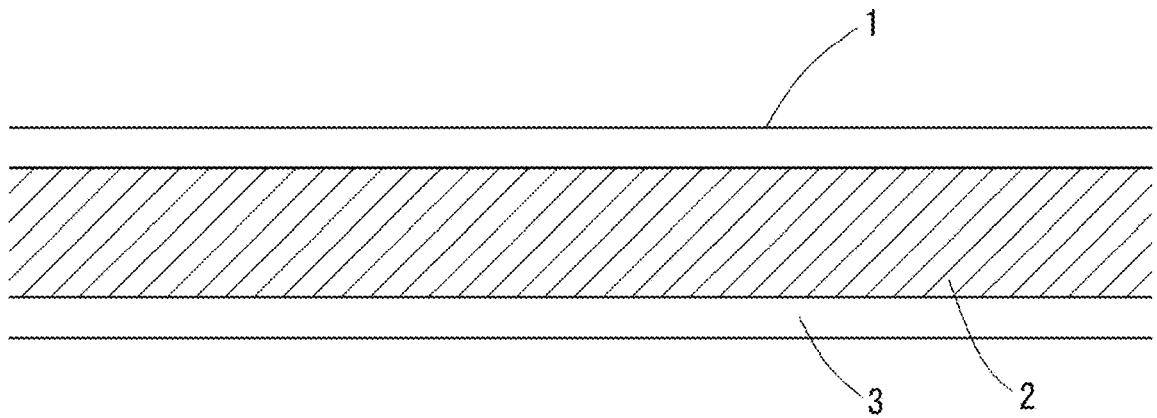
FIGS. 7(a), 7(b), and 7(c) are cross-sectional views of the insulated electric wire, illustrating steps for producing the insulated electric wire.
Figure 7:
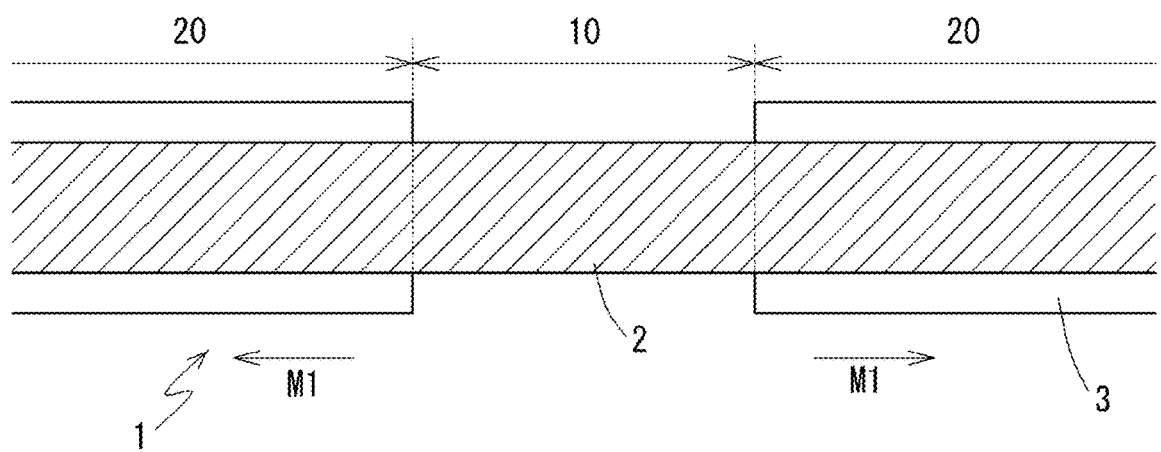
Figure 7:
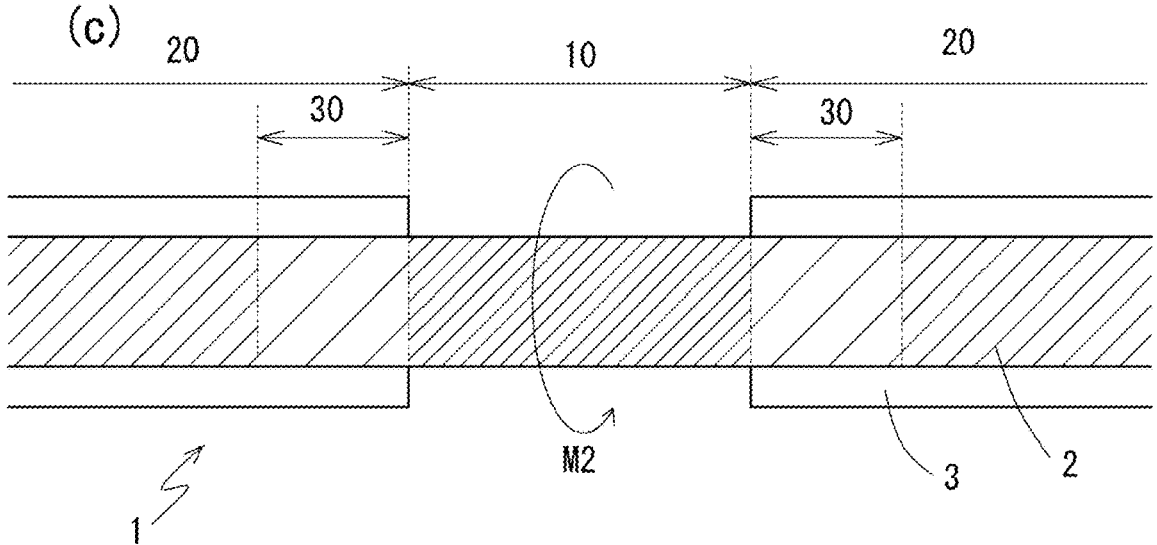
Figure 8:
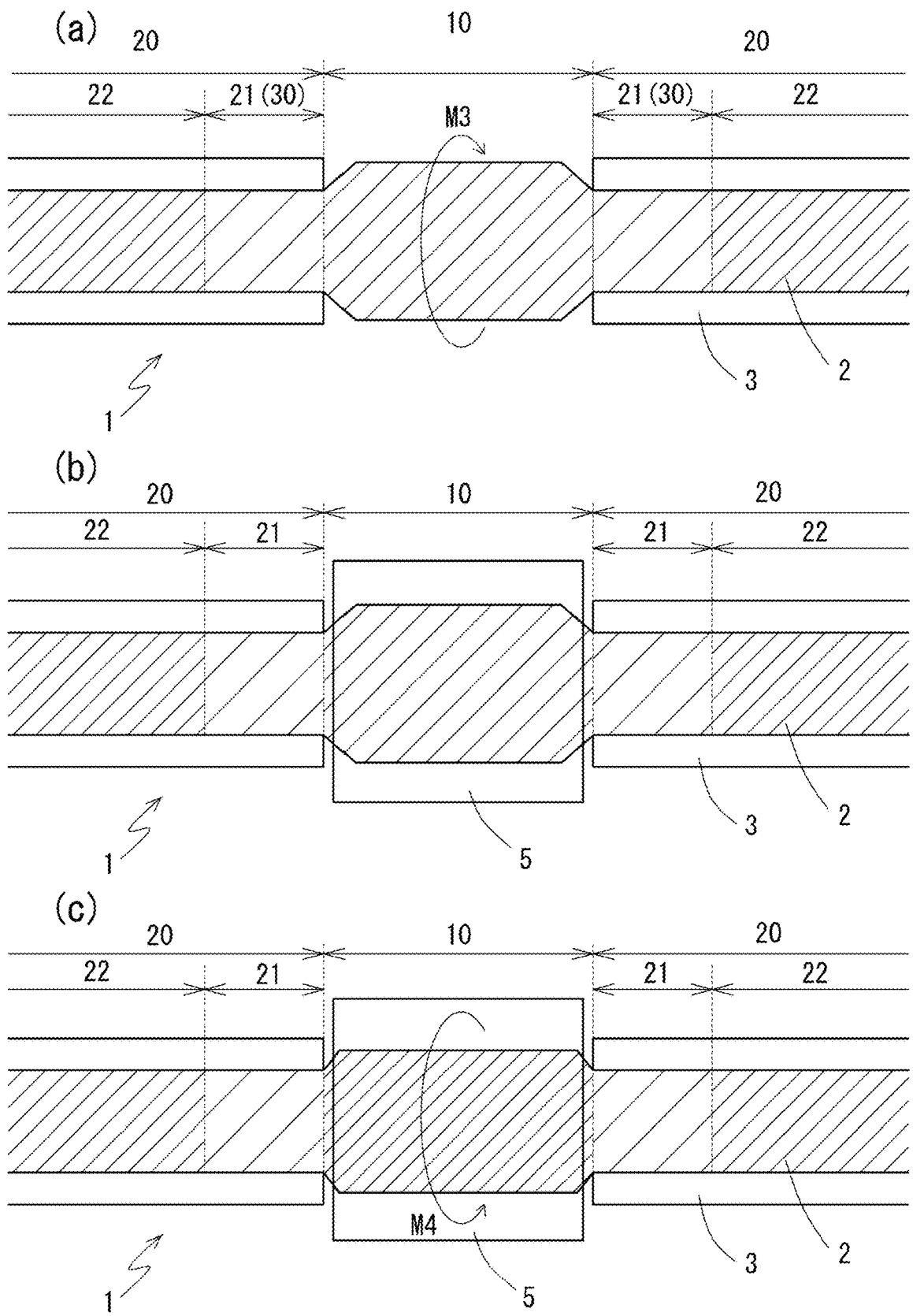
FIGS. 8(a), 8(b), and 8(c) are cross-sectional views of the insulated electric wire, illustrating steps for producing the insulated electric wire.
Figure 9:
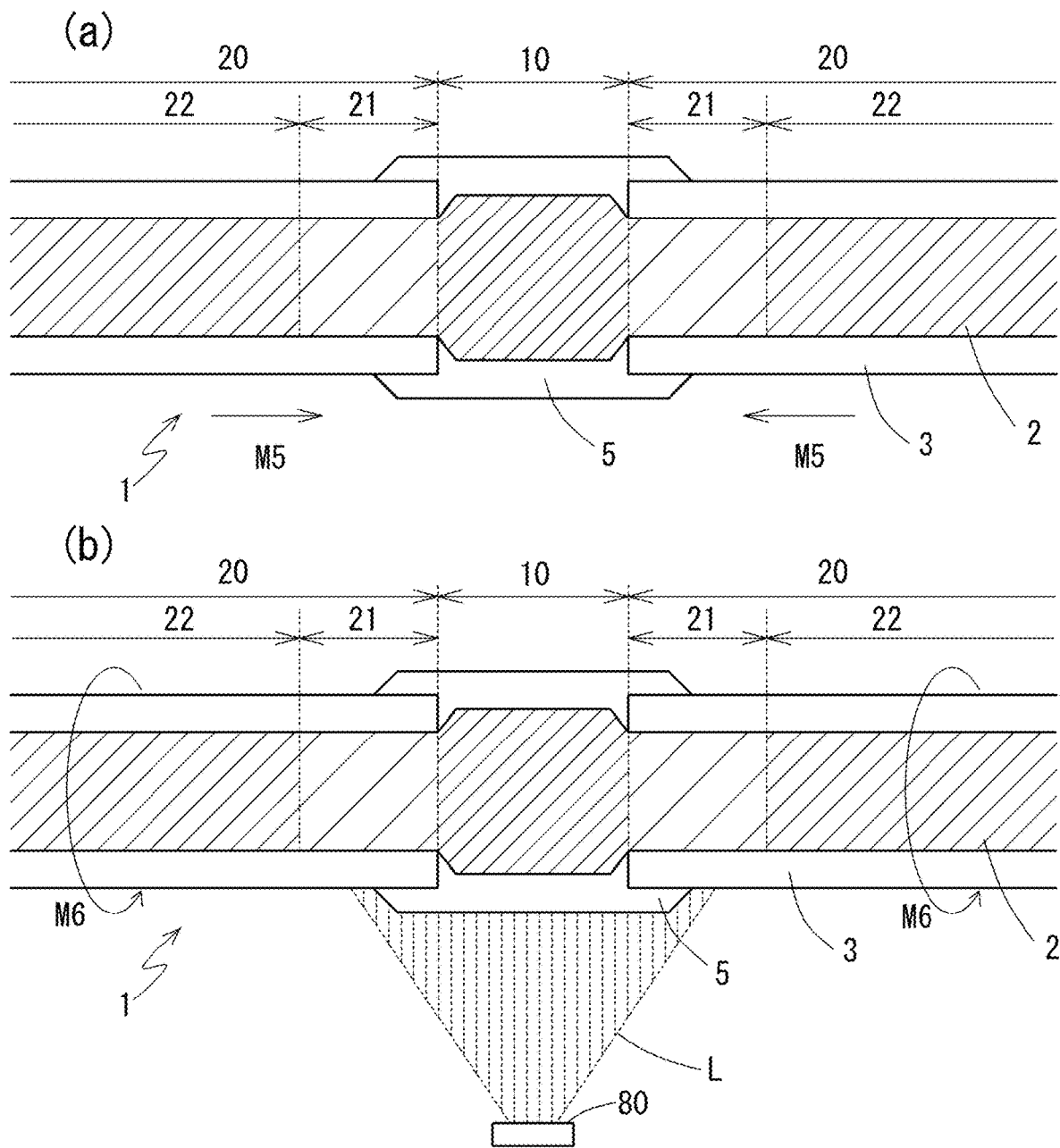
FIGS. 9(a) and 9(b) are cross-sectional views of the insulated electric wire, illustrating steps for producing the insulated electric wire.

FIG. 9(b) schematically illustrates a state of the conductor 2 having the density distribution of the metal material as described above. In FIGS. 7 to 9, the area inside the conductor 2 is hatched, and the higher the density of hatching is, the smaller the twist pitch of the elemental wires 2a is, that is, the smaller the distances between the elemental wires 2a are. Further, the larger the width (vertical length) of the area representing the conductor 2 is, the larger the diameter of the conductor 2 is. Those parameters in the drawings only schematically show the relative relationship of the sizes between the areas, and are not proportional to the twist pitch of the elemental wires 2a or the diameter of the conductor. Furthermore, the parameters in the drawings are discontinuous between different regions, but in the actual insulated electric wire 1, the state of the conductor 2 changes continuously between these regions.

As shown in FIG. 9(b), the conductor 2 has a larger diameter in the exposed portion 10 than in the remote areas 22 of the covered portions 20, and thus has a larger amount of metal material contained as the elemental wires 2a per unit length in the exposed portion 10. Accordingly, by increasing the density of the metal material per unit length in the exposed portion 10 and the actual length of the elemental wires 2a included per unit length, it is possible to realize a state in which the elemental wires 2a are loosened, the distances between the elemental wires 2a are increased, and large gaps between the elemental wires 2a are secured, and thus the water-stopping agent 5 can permeate the gaps between the elemental wires 2a in this state, as will be described in detail later as a method for producing the insulated electric wire 1. As a result, the water-stopping agent 5 is more likely to permeate the gaps between the elemental wires 2a, and thus every part of the exposed portion 10 can be filled with the water-stopping agent 5 easily and highly uniformly.

Furthermore, it is preferable that the twist pitch of the elemental wires 2a be smaller in the exposed portion 10 than the twist pitch in the remote areas 22 of the covered portions 20, in addition to the density of the metal material per unit length that is higher in the exposed portion 10 than in the remote areas 22 of the covered portions 20. This is because the fact that the twist pitch of the elemental wires 2a is smaller in the exposed portion 10 and the distances between the elemental wires 2a are smaller in the exposed portion 10 also brings about an effect of improving the water-stopping performance. That is to say, if the distances between the elemental wires 2a are reduced during formation of the water-stopping portion 4 in which the gaps between the elemental wires 2a are filled with the water-stopping agent 5 in a high flowability state, the water-stopping agent 5 is likely to stay in the gaps between the elemental wires 2a uniformly without dropping or flowing. If the flowability of the water-stopping agent 5 is reduced from this state, a superior water-stopping performance can be obtained in the exposed portion 10. Also, as a result of the twist pitch being smaller in the exposed portion 10 than in the remote areas 22, it is possible to suppress the conductor diameter in the exposed portion 10 so that it is not too large compared to the conductor diameter of the remote areas 22, even if the density of the metal material per unit length is higher in the exposed portion 10 than in the remote areas 22. Accordingly, the outer diameter of the entire water-stopping portion 4 can be made substantially the same as the outer diameter of the insulated electric wire 1 in the remote areas 22, or can be suppressed so as not to be much larger than that in the remote areas 22. As described above, by reducing the twist pitch of the elemental wires 2a1 located in the outer circumferential portion of the conductor 2 in the exposed portion 10, the elemental wires 2a1 are largely inclined, and the cross-sectional shape of the elemental wires 2a1 in the cross section of the water-stopping portion 4 is flattened. Also, by reducing the twist pitch of the elemental wires 2a in the water-stopping portion 4 (exposed portion 10) relative to in the covered portions 20, the ellipticity of the elemental wires 2a in a cross-section is smaller in the exposed portion 10 than in the covered portions 20.

[Insulated Electric Wire According to Second Embodiment]

In the above-described insulated electric wire 1 according to the first embodiment of the present invention, the water-stopping agent 5 is placed in the area of the exposed portion 10 that surrounds the entire circumference of the conductor 2. However, the water-stopping agent 5 does not necessarily need to be placed in the region that surrounds the entire circumference of the conductor 2 to form a water-stopping portion having a sufficient water-stopping performance. Thus, the following will shortly describe an aspect in which the conductor 2 is only partially filled with the water-stopping agent 5, as an insulated electric wire 1A according to a second embodiment of the present invention. The following will describe only differences from the above-described insulated electric wire 1 according to the first embodiment, and structures common with the insulated electric wire 1 according to the first embodiment are shown using the same reference signs and descriptions thereof are omitted.

Figure 4:
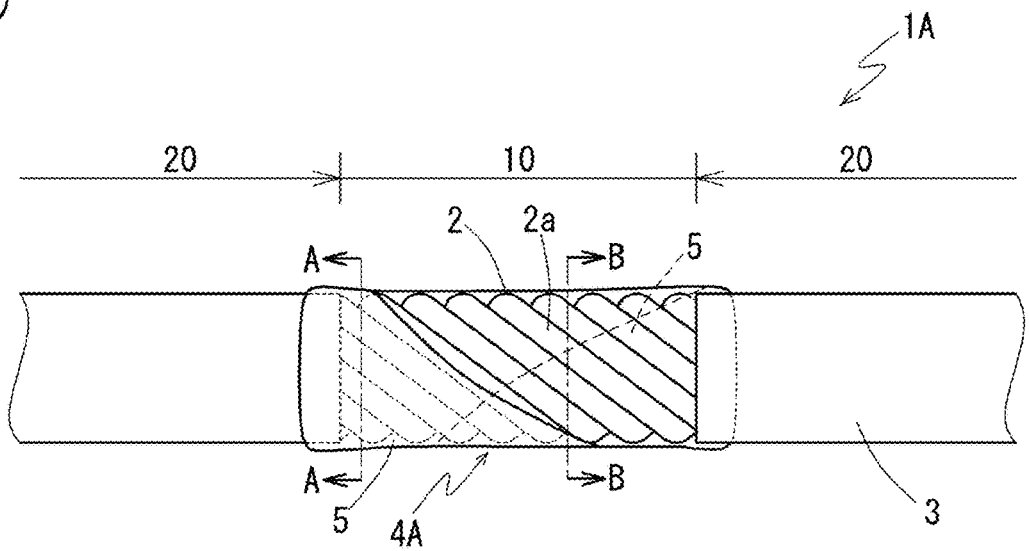
FIGS. 4(a), 4(b), and 4(c) illustrate an insulated electric wire according to a second embodiment of the present invention.
Figure 4:
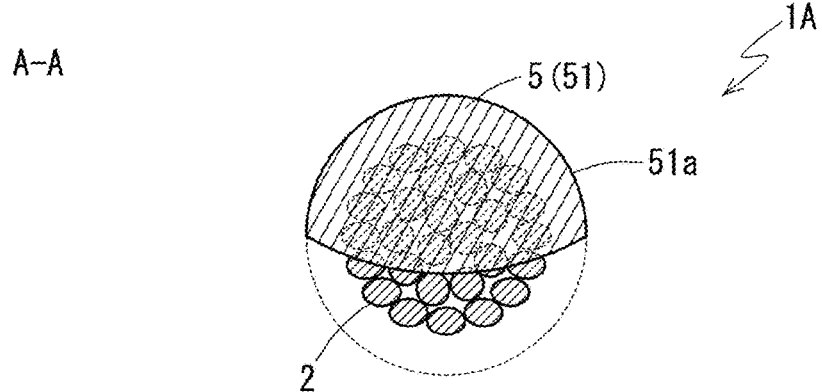
Figure 4:
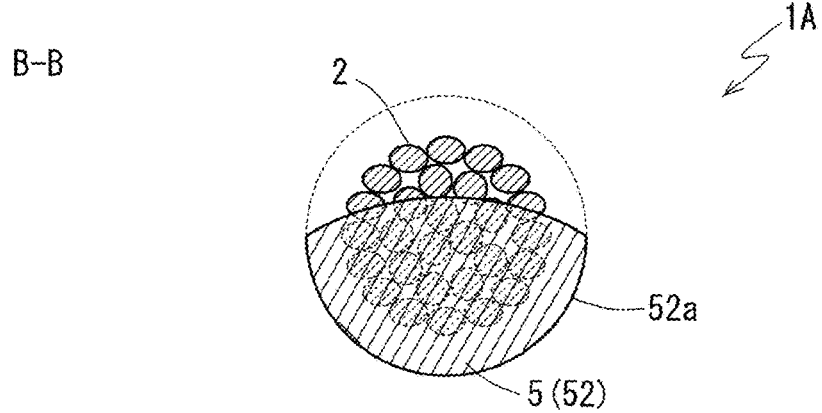

FIG. 4 schematically show an insulated electric wire 1A according to the second embodiment of the present invention. In a water-stopping portion 4A of this insulated electric wire 1A, the water-stopping agent 5 does not surround the entire circumference of the conductor 2 constituting the exposed portion 10 but covers only a partial region. Specifically, as shown in FIGS. 4(b) and 4(c), in a cross section of the water-stopping portion 4A taken along the longitudinal axis direction of the insulated electric wire 1A, the water-stopping agent 5 is placed in only partially filled regions 51 and 52 that cover a partial region of the conductor 2. That is to say, the water-stopping agent 5 fills up areas that are enclosed by surfaces 51a and 52a of the water-stopping agent 5 constituting the partially filled regions 51 and 52, including gaps between the elemental wires 2a. In the areas enclosed by the surfaces 51a and 52a of the water-stopping agent 5, the surface of the elemental wires 2a is in contact with the water-stopping agent 5 or another elemental wire 2a, and is not in contact with another substance such as a bubble B.

In a cross section of the water-stopping portion 4A at positions located in the longitudinal axis direction, only the partially filled regions (51, 52, . . . ) that cover a partial region of the conductor 2 are filled with the water-stopping agent 5, but when the water-stopping portion 4A is viewed as a whole, the water-stopping agent 5 is placed surrounding the entire circumference of the conductor 2. That is to say, superimposition of the partially filled regions (51, 52, . . . ), which are partially filled in a cross-section, along the entire water-stopping portion 4A in the longitudinal axis direction constitutes the region that surrounds the entire circumference of the conductor 2. For example, in the shown configuration, the partially filled region 51 that is filled with the water-stopping agent 5 in the A-A cross-section in FIG. 4(b) is formed covering more than the upper half (corresponding to the front side of FIG. 4(a)) of the conductor 2. On the other hand, the partially filled region 52 that is filled with the water-stopping agent 5 in the B-B cross-section in FIG. 4(c) is formed covering more than the lower half (corresponding to the rear side of FIG. 4(a)) of the conductor 2. When the partially filled regions 51 and 52 in the cross sections at two positions are superimposed on each other, a region that surrounds the entire circumference of the conductor 2 is formed as shown in dotted lines in FIGS. 4(b) and 4(c), with the two partially filled regions 51 and 52 partially overlapping each other in a central portion in the vertical direction.

In the shown configuration, as shown in FIG. 4(a), the partially filled regions (51, 52, . . . ) extend in the longitudinal axis direction of the water-stopping portion 4A while continuously changing the angle with respect to the center of the conductor 2. That is to say, the water-stopping agent 5 is placed in a spiral form extending in the longitudinal axis direction of the conductor 2. If the spiral is provided for one or more pitch, the superimposition of the partially filled regions (51, 52, . . . ) along the entire water-stopping portion 4A in the longitudinal axis direction constitutes the area surrounding the entire circumference of the conductor 2.

Accordingly, in the exposed portion 10, the water-stopping agent 5 is not necessarily placed so as to surround the entire circumference of the conductor 2, and it is sufficient to configure the water-stopping portion 4A so that the water-stopping agent 5 is placed surrounding the entire circumference of the conductor 2 when the water-stopping portion 4A is viewed as a whole. Thus, it is possible to configure the water-stopping portion 4A having a certain level of water-stopping performance, although the water-stopping performance is poorer than that of a water-stopping portion in which the water-stopping agent 5 is placed surrounding the entire circumference of the conductor 2. As a result, it is possible to reduce the amount of use of the water-stopping agent 5, while ensuring a water-stopping performance. Reducing the amount of use of the water-stopping agent 5 also leads to a reduction in the outer diameter of the water-stopping portion 4A.

As described above, the partially filled regions (51, 52, . . . ) may have any shape and area in a cross section of the water-stopping portion 4A at each position, as long as the superimposition of the partially filled regions (51, 52, . . . ) along the entire water-stopping portion 4A in the longitudinal axis direction can constitute the region that surrounds the entire circumference of the conductor 2. However, in view of obtaining a superior water-stopping performance at every position, it is preferable that the partially filled regions (51, 52, . . . ) at each position be set so as to surround a region whose area is more than half of the area of the conductor 2, as shown in FIGS. 4(b) and 4(c).

Also, as described above, when the water-stopping agent 5 is placed in a spiral shape along the longitudinal axis direction of the conductor 2, a sufficiently good water-stopping performance can be realized by arranging the spiral for at least one pitch, but it is possible to further improve the water-stopping performance by increasing the number of turns. On the other hand, also by reducing the number of turns of the spiral in which the water-stopping agent 5 is to be provided with an increase in the areas of the partially filled regions (51, 52, . . . ) in a cross section of the water-stopping portion 4A at each position, a superior water-stopping performance can be realized. If, as shown in FIGS. 4(b) and 4(c), the partially filled regions (51, 52, . . . ) at each position is set so as to cover a region whose area is more than half of the area of the conductor 2, the spiral may be arranged for a half pitch.

[Wire Harness]

Figure 5:
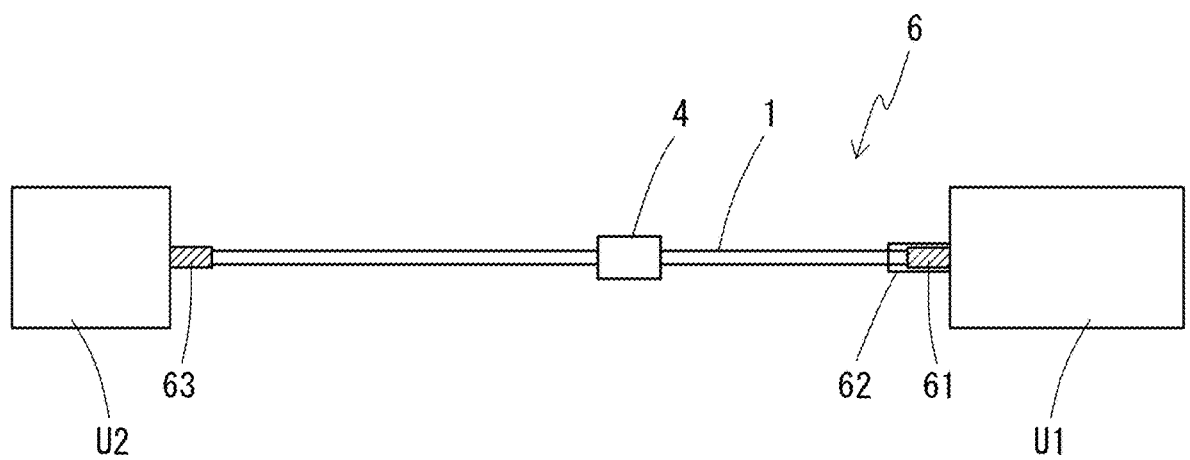
FIG. 5 is a schematic side view illustrating a wire harness according to an embodiment of the present invention, together with devices connected to both ends of the wire harness.

A wire harness 6 according to an embodiment of the present invention includes the above-described insulated electric wire 1 with the water-stopping portion 4 according to the first embodiment of the present invention (or the insulated electric wire 1A with the water-stopping portion 4A according to the second embodiment; the same applies to section "Wire Harness" below). FIG. 5 illustrates an example of the wire harness 6 according to the present embodiment. The insulated electric wire 1 constituting the wire harness 6 is provided with, at the respective ends thereof, electric connections 61 and 63 such as connectors that are capable of connecting to other device U1 and U2. The wire harness 6 may include, in addition to the above-described insulated electric wire 1 according to the embodiment, another type of insulated electric wire (not shown).

The wire harness 6 may employ any type of electric connections 61 and 63 provided at the respective ends of the insulated electric wire 1, and any type of devices U1 and U2 to which the electric connections 61 and 63 are connected, but an appropriate insulated electric wire 1 is such that one end thereof is waterproof while the other end is not waterproof, in view of efficient use of the water-stopping performance with the water-stopping portion 4.

As such an embodiment, the first electric connection 61 provided at one end of the insulated electric wire 1 includes a waterproof structure 62, as shown in FIG. 5. An example of the waterproof structure 62 is such that the connector constituting the first electric connection 61 is provided with a rubber stopper for sealing a space between a connector housing and a connector terminal. With the waterproof structure 62, even if water adheres to the surface or the like of the first electric connection 61, the water is unlikely to enter the first electric connection 61.

On the other hand, the second electric connection 63 provided at the other end of the insulated electric wire 1 does not include a waterproof structure as included in the first electric connection 61. Accordingly, if water adheres to the surface or the like of the second electric connection 63, the water may enter the second electric connection 63.

The exposed portion 10 in which the conductor 2 is exposed is formed in a middle portion of the insulated electric wire 1 constituting the wire harness 6, that is, at a position between the first electric connection 61 and the second electric connection 63, and in an area that includes this exposed portion 10, the water-stopping portion 4 filled with the water-stopping agent 5 is formed. There is no particular limitation to the specific position and number of the water-stopping portions 4, but at least one water-stopping portion 4 is preferably provided at a position closer to the first electric connection 61 than the second electric connection 63, in view of effectively suppressing the influence of water on the first electric connection 61 that has the waterproof structure 62.

The wire harness 6 including electric connections 61 and 63 at both ends of the insulated electric wire 1 can be used to electrically connect two devices U1 and U2. For example, the first device U1 to which the first electric connection 61 having the waterproof structure 62 is connected may be a device such as an electric control unit (ECU) that requires waterproofing. On the other hand, the second device U2 to which the second electric connection 63 without any waterproof structure is connected may be a device that does not require waterproofing.

As a result of the insulated electric wire 1 constituting the wire harness 6 including the water-stopping portion 4, even if water that has externally entered the wire harness 6 moves along the elemental wires 2a constituting the conductor 2, it is possible to suppress the movement of the water along the insulated electric wire 1 from progressing beyond the water-stopping portion 4. That is to say, it is possible to suppress external water from moving beyond the water-stopping portion 4, reaching the electric connections 61 and 63 at both ends, and further entering the devices U1 and U2 connected to the electric connections 61 and 63. For example, even if water adhering to the surface of the second electric connection 63 without any waterproof structure enters the second electric connection 63, and moves along the insulated electric wire 1 via the elemental wires 2a constituting the conductor 2, the movement of the water is stopped by the water-stopping agent 5 with which the water-stopping portion 4 is filled. As a result, the water cannot move to the side on which the first electric connection 61 is provided beyond the water-stopping portion 4, and can neither reach the position of the first electric connection 61 nor enter the first electric connection 61 and the first device U1. By suppressing water movement by the water-stopping portion 4 in this way, it is possible to efficiently use the waterproof characteristics with the waterproof structure 62 with respect to the first electric connection 61 and the device U1.

The effect of suppressing movement of water using the water-stopping portion 4 provided on the insulated electric wire 1 is realized regardless of the position at which the water adheres, the cause thereof, or the environment when or after the water adheres. For example, when the wire harness 6 is installed in an automobile, water that has entered a portion of the insulated electric wire 1, such as a gap between the elemental wires 2a, from the non-waterproof second electric connection 63 can be efficiently prevented from entering the first electric connection 61 having the waterproof structure 62 and the first device U1, due to capillary action or cold breathing. "Cold breathing" refers to a phenomenon in which, when the first electric connection 61 having the waterproof structure 62 and the first device U1 are heated when the automobile is driven for example, and then heat is discharged, the pressure on the first electric connection 61 side becomes lower and the pressure on the second electric connection 63 side becomes relatively higher, so that a difference in pressure occurs along the insulated electric wire 1, and water adhering to the second electric connection 63 climbs toward the first electric connection 61 and the first device U1.

[Method for Producing Insulated Electric Wire]

The following will describe an example of a method for producing the insulated electric wire 1 according to the above-described first embodiment. The insulated electric wire 1A according to the second embodiment can also be produced in substantially the same production method, and only steps in which a different operation is performed will be described focusing on the differences.

Figure 6:
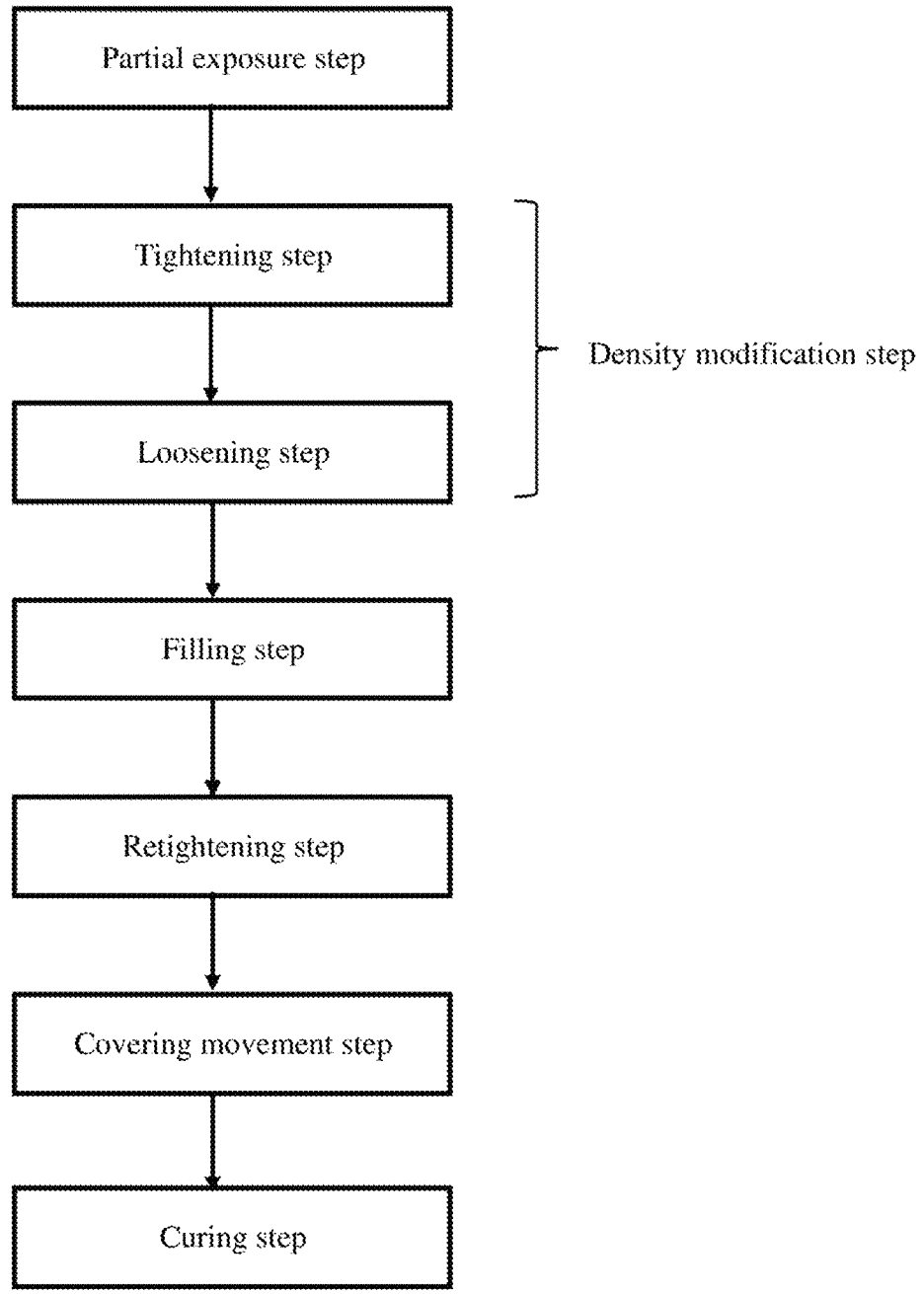
FIG. 6 is a flowchart illustrating steps for producing the insulated electric wire according to the first embodiment.

FIG. 6 schematically illustrates the production method. In this method, the water-stopping portion 4 is formed in a partial area of the insulated electric wire 1 in the longitudinal axis direction thereof by performing: (1) a partial exposure step; (2) a density modification step; (3) a filling step; (4) a retightening step; (5) a covering movement step; and (6) a curing step, in this order. The density modification step (2) may include: (2-1) a tightening step; and subsequently (2-2) a loosening step. The steps will be explained below. Note here that a case in which the water-stopping portion 4 is formed in a middle portion of the insulated electric wire 1 will be described, specific operations in the steps and the order of the steps may be adjusted as appropriate in accordance with details of the configuration of a water-stopping portion 4 to be formed, such as a position at which the water-stopping portion 4 is to be formed.

(1) Partial Exposure Step

First, in the partial exposure step, an exposed portion 10 as shown in FIG. 7(b) is formed in a continuous linear insulated electric wire 1 as shown in FIG. 7(a). The covered portions 20 are provided adjacent to the both sides of the exposed portion 10 in the longitudinal axis direction thereof.

In an example of the method for forming such an exposed portion 10, a substantially ring-shaped slit is formed in the outer circumference of the insulation covering 3 substantially at the center of the area in which the exposed portion 10 is to be formed. Then, the regions of the insulation covering 3 located on both sides of the slit are held from their outer circumference, and are pulled apart along the axial direction of the insulated electric wire 1 (movement M1). Along with this movement, the conductor 2 is exposed between the regions of the insulation covering 3 on both sides. In such a way, the exposed portion 10 is formed adjacent to the covered portions 20.

(2) Density Modification Step

Although the filling step may be performed and the gaps between the elemental wires 2a constituting the conductor 2 in the exposed portion 10 may be filled with the water-stopping agent 5 directly after the exposed portion 10 in which the conductor 2 is exposed has been formed in the partial exposure step, it is preferable to perform the density modification step before the filling step.

In the density modification step, a non-uniform distribution of the density of the metal material is formed among the exposed portion 10 on the one hand, and the adjacent areas 21 and the remote areas 22 of the covered portions 20 on the other hand, and the distances between the elemental wires 2a of the conductor 2 are increased in the exposed portion 10. Specifically, the non-uniform distribution of the density of the metal material is formed such that the density of the metal material per unit length is higher in the exposed portion 10 than in the remote areas 22. Such density distribution can be formed at the same time as when increasing the distances between the elemental wires 2a in the exposed portion 10 in the tightening step and the subsequent loosening step, for example.

By performing the density modification step, it is possible to place, in the subsequent filling step, the water-stopping agent 5 with high uniformity in a state in which the gaps between the elemental wires 2a are widened. Since the water-stopping agent 5 easily permeates even minute gaps between the elemental wires 2a, it is possible to reduce or suppress a space that is not filled with the water-stopping agent 5 and remains as bubbles B.

(2-1) Tightening Step

As shown in FIG. 7(c), in the tightening step, the twist of the elemental wires 2a in the exposed portion 10 is temporarily tightened relative to the original state. Specifically, the insulated electric wire 1 is twisted and rotated in the direction of the twist of the elemental wires 2a so that the twist is further tightened (movement M2). With this, the twist pitch of the elemental wires 2a in the exposed portion 10 is reduced, and the distances between the elemental wires 2a are reduced.

During this operation, when the covered portions 20 located on the both sides of the exposed portion 10 are externally held at portions adjacent to the exposed portion 10, and the conductor 2 is twisted so that the holding portions (i.e., holding portions 30) are rotated in mutually opposite directions, the conductor 2 can be unwound from the holding portions 30 toward the exposed portion 10. As a result of the unwinding of the conductor 2, the twist pitch of the elemental wires 2a in the holding portions 30 is increased relative to the original pitch, and the density of the metal material per unit length is reduced from the original density, as shown in FIG. 7(*c*). Consequently, a portion of the metal material originally located in the holding portions 30 is shifted to the exposed portion 10, and the twist pitch of the elemental wires 2a in the exposed portion 10 is reduced by this shift. Also, the density of the metal material per unit length in the exposed portion 10 is increased. Note that it is preferable that a force of holding the insulated electric wire 1 in the holding portions 30 from the outer circumferential side be suppressed enough to allow the relative movement of the conductor 2 with respect to the insulation covering 3, in view of smoothly unwinding the conductor 2 from the holding portions 30 toward the exposed portion 10.

(2-2) Loosening Step

Thereafter, as shown in FIG. 8(*a*), in the loosening step, the twist of the elemental wires 2a in the exposed portion 10 is loosened again from the state where the twist has been tightened in the tightening step. The twist can be loosened by simply releasing the holding of the holding portions 30 or by holding the holding portions 30 and twisting and rotating the holding portions 30 in the direction opposite to the tightening direction of the tightening step, that is, the direction opposite to the twist direction of the conductor 2 (movement M3).

During the operation, the portions of the conductor 2 unwound from the holding portions 30 located on the both sides of the exposed portion 10 in the tightening step do not fully return into the areas covered with the insulation covering 3 due to the rigidity of the conductor 2, and at least partially remain in the exposed portion 10. As a result, the twist of the elemental wires 2a of the conductor 2 is loosened with the conductor 2 unwound to the exposed portion 10, and thus a state is realized in which the elemental wires 2a whose actual length is larger than the length before the tightening step is performed are bent and disposed in the exposed portion 10. That is, as shown in FIG. 8(*a*), in the exposed portion 10, the diameter of the area constituted entirely by the conductor 2 is larger than the diameter before the tightening step is performed (in FIG. 7(*b*)), and the density of the metal material per unit length is increased. The twist pitch of the elemental wires 2a in the exposed portion 10 is at least larger than the twist pitch in the state where the twist is tightened in the tightening step, and is larger than the twist pitch before the tightening step is performed depending on the degree of loosening. In view of increasing the distances between the elemental wires 2a, the twist pitch of the elemental wires 2a in the exposed portion 10 is preferably larger than the twist pitch before the tightening step is performed.

After the loosening step, the holding portions 30 of the covered portions 20 where the insulation covering 3 was held externally in the tightening step serve as the adjacent areas 21 in which the density of the metal material per unit length is lower than that in the exposed portion 10, and is also lower than that in the state before the tightening step is performed. The areas of the covered portions 20 that have not functioned as the holding portions 30 in the tightening step, that is, the areas distanced from the exposed portion 10, are defined as the remote areas 22. In the remote areas 22, the states of the conductor 2, such as the density of the metal material per unit length and the twist pitch of the elemental wires 2a, do not substantially change from the states before the tightening step is performed. The portion of the metal material in the adjacent areas 21 obtained as a result of the reduction in the density per unit length is shifted to the exposed portion 10, and contributes to increasing the density of the metal material per unit length in the exposed portion 10. As a result, the exposed portion 10 has the highest density of the metal material per unit length, the remote areas 22 have the next highest density, and the adjacent areas 21 have the lowest density.

(3) Filling Step

Next, in the filling step, the gaps between the elemental wires 2a in the exposed portion 10 are filled with the highly flowable water-stopping agent 5, as shown in FIG. 8(*b*). The filling operation with the water-stopping agent 5 may be performed by introducing liquid resin composition into the gaps between the elemental wires 2a using an appropriate method such as application, immersion, dripping, and injection that corresponds to such properties of the water-stopping agent 5 as viscosity.

In the filling step, in addition to filling the gaps between the elemental wires 2a with the water-stopping agent 5, it is preferable to also place the water-stopping agent 5 on the outer circumference of the conductor 2 in the exposed portion 10. To this end, for instance, the amount of the water-stopping agent 5 to be introduced into the exposed portion 10 only needs to be set such that the water-stopping agent 5 is left even after the gaps between the elemental wires 2a are filled. In this case, the water-stopping agent 5 may be placed on, in addition to the outer circumference of the exposed portion 10, the outer circumferential portion of the insulation covering 3 at the end portions of the covered portions 20. However, if the covering movement step is performed after the filling step, the water-stopping agent 5 introduced into the exposed portion 10 may be partially moved onto the outer circumferential portion of the insulation covering 3 in the covered portions 20 in the covering movement step. Accordingly, it is sufficient that the water-stopping agent 5 is placed on the outer circumference of the exposed portion 10 in addition to the gaps between the elemental wires 2a.

As the above-described insulated electric wire 1 according to the first embodiment, when the water-stopping agent 5 is placed in the water-stopping portion 4 so as to surround the entire circumference of the conductor 2, it is preferable that in the filling step, the water-stopping agent 5 is placed in the area that surrounds the entire circumference of the conductor 2 constituting the exposed portion 10. On the other hand, as the insulated electric wire 1A according to the second embodiment, when the water-stopping agent 5 is placed only in the partially filled regions (51, 52, . . . ) that cover a partial region of the conductor 2 in a cross section of the water-stopping portion 4A at each position, it is sufficient to place the water-stopping agent 5 only in the partial area in a cross-section at each position of the conductor 2 constituting the exposed portion 10 in the longitudinal axis direction. Preferably, a filled area in which gaps between the elemental wires 2a are filled with the water-stopping agent 5 is provided adjacent to an unfilled area in which gaps between the elemental wires 2a are not filled with the water-stopping agent 5 in the radial direction of the conductor 2 constituting the exposed portion 10. At this time, it is preferable that the filled area be provided so as to extend over more than half of the distance (diameter of the conductor 2) from one end to the other end of the conductor 2 constituting the exposed portion 10 in the radial direction. For example, when the water-stopping agent 5 is placed by immersion, it is sufficient to immerse an area that corresponds to a lower partial area of the conductor 2, preferably, an area that corresponds to the lower half of the conductor 2 or greater in the water-stopping agent 5, and form the filled area on the lower side and the unfilled area on the upper side.

Since the distances between the elemental wires 2a in the exposed portion 10 are increased in the density modification step and then the water-stopping agent 5 is introduced into the exposed portion 10 in the filling step, the water-stopping agent 5 easily permeates the widened spaces between the elemental wires 2a. Accordingly, the water-stopping agent 5 can easily permeate every part of the exposed portion 10 evenly with high uniformity. Consequently, after the water-stopping agent 5 is cured, a reliable water-stopping portion 4 having an excellent water-stopping performance can be formed. Also, even if the water-stopping agent 5 has a relatively high viscosity such as 4 Pa·s or higher, the water-stopping agent 5 can permeate the gaps between the elemental wires 2a with high uniformity by sufficiently increasing the gaps between the elemental wires 2a.

As described above, a predetermined portion of the insulated electric wire 1 such as an area between the elemental wires 2a may be filled with the water-stopping agent 5 by any method such as application or immersion. However, the portion is preferably filled with the water-stopping agent 5 by immersion, in view of improving the uniformity in filling with the water-stopping agent 5 or operability when water-stopping portions 4 are formed in a plurality of insulated electric wires 1.

For example, a jet device for jetting the water-stopping agent 5 is preferably used to immerse the predetermined portion of the insulated electric wire 1 in the water-stopping agent 5. At this time, it is also possible to bring the insulated electric wire 1 into contact with the jet flow of the water-stopping agent 5 while rotating the insulated electric wire around its axis, in order to place the water-stopping agent 5 with high uniformity.

In the filling step, the amount or distribution of bubbles B in the water-stopping portion 4 to be formed can be controlled based on the conditions when introducing the water-stopping agent 5 into a predetermined portion including the gaps between the elemental wires 2a. By introducing the water-stopping agent 5 with a relatively low flow rate, it is possible to suppress the generation of bubbles in the liquid water-stopping agent 5, and reduce the number and the size of bubbles B to be formed in the water-stopping portion 4 including bubbles B that come in contact with a elemental wire 2a. For example, when the filling step is performed using a jet device as described above, the gaps between the elemental wires 2a are likely to be filled with the water-stopping agent 5 with high uniformity even with a low flow rate of the water-stopping agent 5, and thus it is possible to form a water-stopping portion 4 while suppressing the generation of bubbles B.

On the other hand, when the water-stopping agent 5 is introduced with a high flow rate of the water-stopping agent 5, bubbles are likely to occur in the uncured liquid water-stopping agent 5 due to generation of bubbles derived from air dissolved in the water-stopping agent 5, external involution of air, or the like. If the water-stopping agent 5 is cured in this state, bubbles B will be generated in the water-stopping portion 4. For example, when the water-stopping agent 5 is forced to be drawn into the gaps between the elemental wires 2a by inserting a portion of the insulated electric wire 1 that is to be filled with the water-stopping agent 5 into a container, and applying a negative pressure to the inside of the container, a gas component dissolved in the water-stopping agent 5 is likely to form bubbles when the water-stopping agent 5 is drawn. Also, when the water-stopping agent 5 is forced to be drawn with a negative pressure, an air layer is likely to be formed at a portion in the downstream of the flow of the water-stopping agent 5. Due to these factors, after the curing of the water-stopping agent 5, bubbles B are likely to be formed in the water-stopping portion 4 including a portion adjacent to a elemental wire 2a. When the gaps between the elemental wires 2a are filled with the water-stopping agent 5 under a pressurized condition as in the configuration disclosed in Patent Document 1, bubbles B are also likely to be formed in the water-stopping portion 4, due to an air layer being formed in accordance with the flow of the water-stopping agent 5.

(4) Retightening Step

After the completion of the filling step, the retightening step is performed as shown in FIG. 8(c), and the distances between the elemental wires 2a are reduced in the exposed portion 10 in the state in which the gaps between the elemental wires 2a are filled with the water-stopping agent 5. Similar to the aforementioned tightening step in the density modification step for example, this step can be performed such that the covered portions 20 located on the both sides of the exposed portion 10 are held at the adjacent areas 21 externally from the insulation covering 3, and the conductor 2 is twisted and rotated in the direction of the twist of the elemental wires 2a so that the twist of the elemental wires 2a is tightened (movement M4). Note that in contrast to the tightening step, an operation of unwinding the conductor 2 to the exposed portion 10 is not performed in the retightening step.

When the gaps between the elemental wires 2a in the exposed portion 10 are narrowed in the retightening step, the water-stopping agent 5 is confined in the narrowed gaps. Thus, the water-stopping agent 5 is likely to stay in the gaps between the elemental wires 2a without flowing or dropping until the fluidity of the water-stopping agent 5 is sufficiently lowered due to curing or the like. Accordingly, after the water-stopping agent 5 is cured, a reliable water-stopping portion 4 having an excellent water-stopping performance is easily formed. To increase the effect, it is preferable that the twist pitch of the elemental wires 2a in the exposed portion 10 be reduced in the retightening step. For instance, it is preferable that after the retightening step, the twist pitch of the elemental wires 2a be smaller in the exposed portion 10 than in the adjacent areas 21 as well as in the remote areas 22. After the retightening, in a cross section of the formed water-stopping portion 4 taken perpendicular to the longitudinal axis direction of the insulated electric wire 1, the cross-sectional shape of the elemental wires 2a1 located in the outer circumferential portion of the conductor 2 is likely to be flattened. Also, the ellipticity of the elemental wires 2a in the cross-section taken perpendicular to the longitudinal axis direction of the insulated electric wire 1 is likely to be smaller in the water-stopping portion 4 than in the covered portions 20. As described above, those features in which the elemental wires 2a1 located in the outer circumferential portion of the conductor 2 have a flattened cross-sectional shape and the ellipticity of the elemental wires 2a1 in a cross-section is smaller in the water-stopping portion 4 than in the covered portions 20 serve as an indicator used when a sufficient amount of water-stopping agent 5 is held between the elemental wires 2a.

Also, by performing the retightening step, rearrangement of the water-stopping agent 5 with which the areas between the elemental wires 2a are filled is facilitated, and the uniformity in the distribution of the water-stopping agent 5 is improved. For example, even if bubbles B are generated in the water-stopping agent 5 after the completion of the filling step, the water-stopping agent 5 may move during the execution of the retightening step, and the bubbles B may be filled and discarded by the water-stopping agent 5 that has moved from the surrounding portion. Furthermore, by performing the retightening step, it is also possible to improve the uniformity in the distribution of the water-stopping agent 5 in the circumferential direction of the conductor 2. Specifically, in the production of the insulated electric wire 1A according to the second embodiment, when a filled area and an unfilled area are provided adjacent to each other in the radial direction of the exposed portion 10 such as the vertical direction in the filling step, and the conductor 2 is twisted in the retightening step, the water-stopping agent 5 placed in the filled area spreads over the extensive area of the conductor 2. For example, a state is easily obtained in which the water-stopping agent 5 is placed in a spiral shape over the entire circumference of the conductor 2.

The retightening step is preferably performed while the water-stopping agent 5 filling up the gaps between the elemental wires 2a is flowable, that is, before the water-stopping agent 5 is cured or during the curing process, if the water-stopping agent 5 is made of a curable resin composition. Accordingly, the retightening operation is unlikely to be impaired by the water-stopping agent 5.

Specifically, when the aforementioned filling step is performed by immersing the insulated electric wire 1 in the water-stopping agent 5 using the jet device or the like, the retightening step is preferably performed in a state in which the insulated electric wire 1 is immersed in the water-stopping agent 5. This can easily avoid a situation where the water-stopping agent 5 is unwound and removed from the gaps between the elemental wires 2a due to the retightening operation itself. For example, preferably, after the predetermined portion of the insulated electric wire 1 including the exposed portion 10 has been brought into contact with the jet flow of the water-stopping agent 5, and the water-stopping agent 5 has been placed into the gaps between the elemental wires 2a or the like as the filling step, the retightening step is performed by twisting and rotating the conductor 2 (movement M4) while the insulated electric wire 1 is in contact with the jet flow.

(5) Covering Movement Step

Next, in the covering movement step, as shown in FIG. 9(a), the regions of the insulation covering 3 located in the covered portions 20 on the both sides of the exposed portion 10 are moved towards the exposed portion 10, approaching each other (movement M5). Similar to the retightening step, the covering movement step is preferably performed while the water-stopping agent 5 filling up the exposed portion 10 is flowable, that is, before the water-stopping agent 5 is cured or during the curing process, if the water-stopping agent 5 is made of a curable resin composition. The covering movement step and the retightening step may also be performed substantially in a single operation. As described above, when the filling step is performed by immersing the insulated electric wire 1 in the water-stopping agent 5 using the jet device or the like, and the retightening step is performed in this state, preferably, the covering movement step is also performed in the state in which the insulated electric wire 1 is immersed in the water-stopping agent 5.

Even if there is an area in which the gaps between the elemental wires 2a cannot be filled with the sufficient amount of water-stopping agent 5 in the filling step at an end of the exposed portion 10 or the like, the water-stopping agent 5 will reach such an area in the covering movement step, and a state will be realized in which the gaps between the elemental wires 2a are filled with the water-stopping agent 5 in the entire exposed portion 10 in which the conductor 2 is exposed. Furthermore, a part of the water-stopping agent 5 placed on the outer circumference of the conductor 2 in the exposed portion 10 can be moved to the outer circumference of the insulation covering 3 in the covered portions 20. Thus, the water-stopping agent 5 is continuously placed over three areas, namely, the gaps between the elemental wires 2a in the exposed portion 10, the outer circumference of the conductor 2 in the exposed portion 10, and the outer circumferences of the parts of the insulation covering 3 at the ends of the covered portions 20.

Since the water-stopping agent 5 is placed over the three areas, it is possible to form a water-stopping portion 4 that has an excellent water-stopping performance in the areas between the elemental wires 2a, has an outer circumference physically protected and electrically insulated, and has an excellent water-stopping performance between the conductor 2 and the insulation covering 3, using the same material at the same time, after the completion of the subsequent curing step. The covering movement step may be omitted if, in the filling step, a sufficient amount of water-stopping agent 5 can be introduced into an area extending over the entire exposed portion 10, and further to an area including the end portions of the covered portions 20 located on the both sides of the exposed portion 10, for example.

(6) Curing Step

Finally, the water-stopping agent 5 is brought to a less flowable state in the curing step. If the water-stopping agent 5 is made of various types of curable resin composition, a curing method that corresponds to the type only needs to be used. That is to say, if the water-stopping agent 5 has heat curability, it may be cured by heating, if the water-stopping agent 5 has light curability, it may be cured by light irradiation, if the water-stopping agent 5 has moisture curability, it may be cured by humidification, and if the water-stopping agent 5 has anaerobic curability, it may be cured with time in a state in which the water-stopping agent 5 is in contact with the conductor 2. After the curing step, an insulated electric wire 1 provided with a water-stopping portion 4 having an excellent water-stopping performance can be obtained.

In the curing step, as shown in FIG. 9(b), the insulated electric wire 1 is preferably rotated around its axis (movement M6) until the water-stopping agent 5 is fully cured. Moreover, if after the completion of the filling step, the retightening step and the covering movement step, time is required before the curing step is started, due to moving the insulated electric wire 1 between the processing devices, or the like, it is preferable to rotate the insulated electric wire 1 also for that time.

If the water-stopping agent 5 is cured without rotating the insulated electric wire 1 around its axis, that is, while the insulated electric wire 1 remains unmoved, the uncured water-stopping agent 5 will drop in accordance with gravity, and the water-stopping agent 5 will be cured in a state in which a thicker layer of the water-stopping agent 5 is formed at a lower position in the gravity direction than at a higher position. Thus, after curing the water-stopping agent 5, the conductor 2 is likely to be eccentric in the water-stopping portion 4 (the eccentricity is likely to be low).

Accordingly, by performing the curing step while rotating the insulated electric wire 1 around its axis, or rotating the insulated electric wire 1 around its axis before the curing step is started, the uncured water-stopping agent 5 is unlikely to stay at one position in the circumferential direction of the insulated electric wire 1, and the layers of the water-stopping agent 5 are likely to have a highly uniform thickness around the entire circumference. Thus, the eccentricity of the conductor 2 in the water-stopping portion 4 is reduced (the eccentricity is likely to be high), making it possible to realize a water-stopping portion 4 having highly uniform water-stopping performance and physical characteristics.

Also, by rotating the insulated electric wire 1 around its axis, rearrangement of the water-stopping agent 5 is facilitated also in the areas between the elemental wires 2a, and the water-stopping agent 5 is easily cured in a state in which the uniformity of the distribution of the water-stopping agent 5 is increased. For example, even if bubbles B are generated in the water-stopping agent 5, the water-stopping agent 5 may move in accordance with the rotation of the insulated electric wire 1 around its axis, and the bubbles B may be filled and discarded by the water-stopping agent 5 that has moved from the surrounding region, and the water-stopping agent 5 may be cured in this state. Also, by rotating the insulated electric wire 1 around its axis to increase the uniformity in the thickness of the layer of the water-stopping agent 5 in the outer circumferential portion of the conductor 2, and curing the water-stopping agent 5 in this state, the curing of the water-stopping agent 5 filling up every portion of the areas between the elemental wires 2a can progress under the condition of a high uniformity. For example, if the water-stopping agent 5 is made of a light curable resin composition, increasing the uniformity in the thickness of the layer of the water-stopping agent 5 formed in the outer circumferential portion of the conductor 2 can increase the uniformity in the intensity of light that passes through the layer of the water-stopping agent 5 and reaches the areas of the elemental wires 2a, and can increase the uniformity of curing conditions such as a curing speed, when every portion of the water-stopping agent 5 is cured. As a result, it is possible to suppress the formation of a nonuniform structure such as bubbles B at a position, for example, at which the water-stopping agent 5 is not sufficiently cured, due to a nonuniform curing condition.

Specifically, if the water-stopping agent 5 has light curability such as ultraviolet curability, it is possible to irradiate the entire insulated electric wire 1 in the circumferential direction with the light L from the light source 80 by performing the curing step while rotating the insulated electric wire 1 around its axis, even if only one light source 80 is used, thus making it possible to uniformly progress light curing of the water-stopping agent 5 over the entire circumference. A light curing mechanism is often configured to progress the curing of the water-stopping agent 5 with high speed, and if a light curable resin is used as the water-stopping agent 5, the water-stopping agent 5 will be placed in the areas between the elemental wires 2a or on the outer circumference of the conductor 2 with high uniformity such that generation of bubbles B or eccentricity is suppressed, making it possible to form the cured water-stopping portion 4 having superior water-stopping performance with high productivity.

Example

Hereinafter, an example of the present invention will be described. Here, the relationship between the distribution of the water-stopping agent and the water-stopping performance in the water-stopping portion was tested. Note however that the present invention is not limited to this example.

Test Method
(1) Preparation of Samples

An insulated electric wire was prepared by covering the outer circumference of a copper stranded conductor having a conductor cross-sectional area of 0.5 mm$^2$ (diameter of elemental wires; 0.18 mm; number of elemental wires; 20) with a PVC insulation covering having a thickness of 0.35 mm. An exposed portion having a length of 8 mm was formed at a middle portion of the insulated electric wire. Then, a water-stopping agent was used to form a water-stopping portion in the exposed portion. As the water-stopping agent, ThreeBond "3062F", which is a resin having ultraviolet curability and anaerobic curability, was used.

When forming the water-stopping agent, the steps were executed in the order shown in the flowchart of FIG. 6. In the filling step, an area that surrounds the entire circumference of a portion of the insulated electric wire that includes the entire exposed portion was filled with the water-stopping agent. Also, in the curing step, ultraviolet irradiation was performed while rotating the insulated electric wire around its axis.

Here, when a sample of the example was produced, the filling step was executed using a jet flow under atmospheric pressure. The retightening step and the covering movement step were also performed in a state in which the insulated electric wire was in contact with the jet flow. On the other hand, when a sample of a comparative example was produced, in the filling step, instead of using a jet flow, a container in which the area of the insulated electric wire that includes the exposed portion was contained was subjected to evacuation of air using a vacuum pump, and the water-stopping agent was drawn into the container under a negative pressure of −75 kPa, so as to be injected into the area including the gaps between the elemental wires. The flow rate of the water-stopping agent at this time was greater than the flow rate of the jet flow according to the embodiment.

(2) Observation of Cross Section of Water-Stopping Portion

The water-stopping portions of the samples of the example and the comparative example were cut in a central portion in the longitudinal axis direction thereof, perpendicularly to the longitudinal axis direction of the insulated electric wire. Then, pictures of the cross sections were taken using an optical microscope, and the states of the cross sections were observed.

(3) Evaluation of Water-Stopping Performance

For the water-stopping portion of each of the examples and the comparative examples, a leakage test was conducted to evaluate the water-stopping performance between the elemental wires, and between the conductor and the insulation covering. Specifically, a region of each insulated electric wire extending from the water-stopping portion to one end was immersed in water, and an air pressure of 200 kPa was applied from the other end of the insulated electric wire. Then, the water-stopping portion and the end of the insulated electric wire that were immersed in the water were visually observed.

If it was confirmed that no bubble was generated in any of the portions between the elemental wires in the water-stopping portion, that is, any of the middle portion of the water-stopping portion and the end portions of the insulated electric wires, the water-stopping performance was evaluated as excellent. On the other hand, if it was confirmed that a bubble was generated in at least one of the portions, the water-stopping performance was evaluated as poor.

Results

Figure 11:
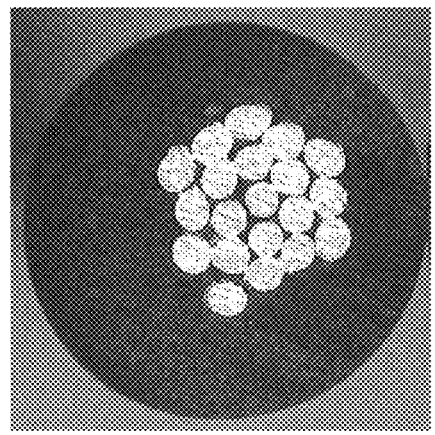
FIGS. 11(a) and 11(b) are pictures of cross sections of actually produced water-stopping portions.
Figure 11:
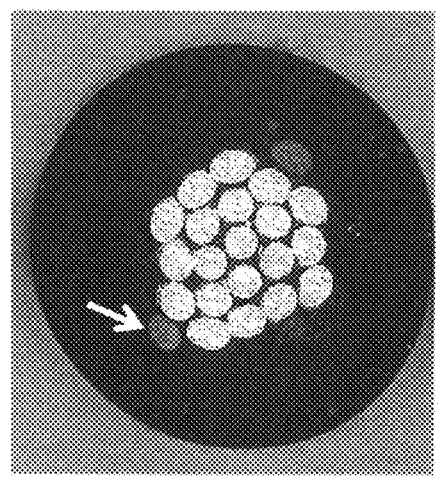

FIGS. 11(a) and 11(b) respectively show pictures of cross sections of the water-stopping portions of the samples according to the example and the comparative example. In each picture, an area observed as bright corresponds to a elemental wire constituting the conductor, and an area observed as dark corresponds to the water-stopping agent. Also, an area in the water-stopping agent observed as relatively bright gray corresponds to a bubble.

As evaluation results of the water-stopping performance, for the example, occurrence of a bubble was not observed and the water-stopping performance was evaluated as excellent. On the other hand, for the comparative example, occurrence of a bubble was observed and the water-stopping performance was evaluated as poor.

In the cross section of the water-stopping portion of the sample according to the comparative example shown in FIG. 11(b), the areas between the elemental wires and in the outer circumferential portion of the conductor are filled with the water-stopping agent. However, as indicated by the arrow, a bubble is formed that is in contact with a elemental wire. It is appreciated that the reason why the bubble was formed in the water-stopping agent is that, when the gaps between the elemental wires were filled with the water-stopping agent, the water-stopping agent was forced to be drawn under the condition of a negative pressure, and thus a bubble was generated in the water-stopping agent, and the water-stopping agent was cured in this state.

On the other hand, in the cross section of the water-stopping portion of the sample according to the embodiment shown in FIG. 11(a), the areas between the elemental wires and in the outer circumferential portion of the conductor were densely filled with the water-stopping agent, and no bubble that is in contact with a elemental wire as shown in FIG. 11(b) was observed. Although a small bubble is viewed near the upper left of the conductor, this bubble is apparently formed in the outer region of the conductor, and is not in contact with a elemental wire. Accordingly, in the sample according to the embodiment, the surface of each elemental wire is not in contact with a bubble but is in contact with the water-stopping agent or another elemental wire. It is appreciated that the reason why the generation of a bubble was suppressed is that, when the gaps between the elemental wires were filled with the water-stopping agent, the water-stopping agent was introduced with a relatively low flow rate using a jet flow.

It is appreciated that such a difference in the distribution state of the water-stopping agent reflects the difference in the water-stopping performance between the embodiment and the comparative example. That is to say, it is conceivable that in the embodiment, the water-stopping portion was densely filled with the water-stopping agent, and the surface of the elemental wires was in contact with only the water-stopping agent or another elemental wire, and thus the water-stopping portion had a superior water-stopping performance, whereas in the comparative example, a bubble was formed that is in contact with a elemental wire, and thus the water-stopping performance was low.

Embodiments of the present invention have been described in detail but the present invention is in no way restricted to the embodiments described above and can be modified variously in a range without departing from the gist of the present invention.

LIST OF REFERENCE NUMERALS 1, 1A Insulated electric wire
2 Conductor
2a Elemental wire
3 Insulation covering
4, 4A Water-stopping portion
5 Water-stopping agent
51, 52 Partially filled region
6 Wire harness
10 Exposed portion
20 Covered portion
21 Adjacent area
22 Remote area
61 First electric connection
62 Waterproof structure
63 Second electric connection
B Bubble

The invention claimed is:

1. An insulated electric wire comprising:
a conductor in which a plurality of elemental wires made of a metal material are twisted together; and
an insulation covering that covers an outer circumference of the conductor;
wherein the insulated electric wire comprises:
an exposed portion in which the insulation covering is removed from the outer circumference of the conductor;
a covered portion in which the insulation covering covers the outer circumference of the conductor, the exposed portion and the covered portion being provided adjacent to each other in a longitudinal axis direction of the insulated electric wire; and
a water-stopping portion in which gaps between the plurality of elemental wires in the exposed portion are filled with a water-stopping agent, and
in an area enclosed by a surface of the water-stopping agent, surfaces of the plurality of elemental wires are in contact with only the water-stopping agent or another elemental wire, and
ellipticities of the plurality of elemental wires in a cross section of the water-stopping portion taken perpendicular to the longitudinal axis direction of the insulated electric wire are smaller than ellipticities of the plurality of elemental wires in a cross section of the covered portion taken perpendicular to the longitudinal axis direction of the insulated electric wire.

2. The insulated electric wire according to claim 1, wherein in a cross section of the water-stopping portion that is taken perpendicular to the longitudinal axis direction of the insulated electric wire, an elemental wire located in an outer circumferential portion of the conductor has a more flattened shape than an elemental wire located inward of the outer circumferential portion of the conductor.

3. The insulated electric wire according to claim 1, wherein the area enclosed by the surface of the water-stopping agent does not include any bubble, or includes only bubbles whose entire circumference is surrounded by the water-stopping agent, and that are located on an outer side of the conductor.

4. The insulated electric wire according to claim 1, wherein in the water-stopping portion, the water-stopping agent is placed surrounding an entire circumference of the conductor.

5. The insulated electric wire according to claim 1, wherein the water-stopping agent fills a partially filled region which covers partial regions of the conductor in two or more cross sections of the water-stopping portion that are taken perpendicular to the longitudinal axis direction of the insulated electric wire, and
the partially filled region covers an area that surrounds an entire circumference of the conductor in a superimposition of the two or more cross sections along an entirety of the water-stopping portion in the longitudinal axis direction of the insulated electric wire.

6. The insulated electric wire according to claim 1, wherein each of the plurality of elemental wires constituting the conductor has a circular shape in a cross section taken perpendicular to a longitudinal axis direction of the plurality of elemental wires.

7. The insulated electric wire according to claim 1, wherein, for an inclination angle with respect to the longitudinal axis direction of the insulated electric wire, the plurality of elemental wires located in an outer circumferential portion of the conductor has a larger inclination angle than the plurality of elemental wires located inward of the outer circumferential portion of the conductor, resulting in that, in a cross section of the water-stopping portion that is taken perpendicular to the longitudinal axis direction of the insulated electric wire, at least one elemental wire located in the outer circumferential portion of the conductor has a more flattened shape than an elemental wire located inward of the at least one elemental wire located in the outer circumferential portion of the conductor.

8. A wire harness comprising:

the insulated electric wire according to claim 1; and electric connections provided at both ends of the insulated electric wire, the electric connections being capable of connecting to other devices.

9. The wire harness according to claim 8, wherein one of the electric connections provided on the both ends of the insulated electric wire includes a waterproof structure for preventing entry of water from outside, and another one of the electric connections does not include any waterproof structure, and the water-stopping portion is provided at a position between the one and the another one of the electric connections.

10. A method for producing the insulated electric wire according to claim 1, the insulated electric wire including the conductor in which the plurality of elemental wires made of a conductive material are twisted together; and the insulation covering that covers the outer circumference of the conductor, the method comprising:

a partial exposure step of providing the exposed portion in which the insulation covering is removed from the outer circumference of the conductor, and the covered portion in which the insulation covering covers the outer circumference of the conductor, the exposed portion and the covered portion being provided adjacent to each other in the longitudinal axis direction of the insulated electric wire;

a filling step of filling gaps between the plurality of elemental wires in the exposed portion with the water-stopping agent made of a curable resin composition; and a curing step of curing the water-stopping agent placed in the exposed portion while rotating the insulated electric wire around an axis of the insulated electric wire.

11. The method for producing the insulated electric wire according to claim 10, wherein after completion of the filling step, the insulated electric wire is rotated around an axis of the insulated electric wire until the curing step is started.

12. The method for producing the insulated electric wire according to claim 10, wherein in the filling step, the gaps between the plurality of elemental wires are filled with the water-stopping agent by bringing the exposed portion into contact with a jet flow of the water-stopping agent.

13. The method for producing the insulated electric wire according to claim 10, wherein a density modification step is executed between the partial exposure step and the filling step, the density modification step increasing distances between the plurality of elemental wires in the exposed portion while increasing a density of the conductive material per unit length in the exposed portion, and a retightening step is executed after the execution of the filling step, the retightening step reducing the distances between the plurality of elemental wires in the exposed portion while decreasing a twist pitch of the plurality of elemental wires.

14. The method for producing the insulated electric wire according to claim 13, wherein, in the filling step, a filled area, in which the gaps between the plurality of elemental wires are filled with the water-stopping agent and which extends over more than half of an area from one end to another end of the exposed portion in a radial direction, and an unfilled area in which the gaps between the plurality of elemental wires are not filled with the water-stopping agent are provided adjacent to each other in the radial direction of the exposed portion.

15. An insulated electric wire comprising:

a conductor in which a plurality of elemental wires made of a metal material are twisted together; and an insulation covering that covers an outer circumference of the conductor;

wherein the insulated electric wire comprises:

an exposed portion in which the insulation covering is removed from the outer circumference of the conductor;

a covered portion in which the insulation covering covers the outer circumference of the conductor, the exposed portion and the covered portion being provided adjacent to each other in a longitudinal axis direction of the insulated electric wire; and a water-stopping portion in which gaps between the plurality of elemental wires in the exposed portion are filled with a water-stopping agent, and in an area enclosed by a surface of the water-stopping agent, surfaces of the plurality of elemental wires are in contact with only the water-stopping agent or another elemental wire, elemental wires located in an outer circumferential portion of the conductor has a similar circular shape as elemental wires located inward of the outer circumferential portion of the conductor in a cross section that is taken perpendicular to a longitudinal axis direction of the plurality of elemental wires, and in a cross section of the water-stopping portion that is taken perpendicular to the longitudinal axis direction of the insulated electric wire, the elemental wires located in the outer circumferential portion of the conductor has a more flattened shape than the elemental wires located inward of the outer circumferential portion of the conductor.

16. The insulated electric wire according to claim 15, wherein ellipticity of the plurality of elemental wires are smaller in the cross section of the water-stopping portion that is taken perpendicular to the longitudinal axis direction of the insulated electric wire than in a cross section of the covered portion that is taken perpendicular to the longitudinal axis direction of the insulated electric wire.

* * * * *